(12) United States Patent
McClure et al.

(10) Patent No.: US 9,560,405 B2
(45) Date of Patent: Jan. 31, 2017

(54) BACKGROUND TRANSFER SERVICE FOR APPLICATIONS ON MOBILE DEVICES

(75) Inventors: Marc David McClure, Seattle, WA (US); Abolade Gbadegesin, Seattle, WA (US); Chittur Padmanabhan Subbaraman, Carnation, WA (US); Jianping Yin, Sammamish, WA (US); Jorge I. Raastroem, Issaquah, WA (US); Yasser Shaaban, Seattle, WA (US); Timothy Daniel Noonan, Cary, NC (US); Rachel Jiang, Redmond, WA (US); Peter John Torr, Bellevue, WA (US); Vishal Ghotge, Seattle, WA (US); Gregory Arthur de Souza, Seattle, WA (US); Pavan Rajamohan Hullumane, Seattle, WA (US); Adrian Dragomir, Bellevue, WA (US); Darin Miller, Sammamish, WA (US); Megan Galbraith Donahue, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 452 days.

(21) Appl. No.: 13/164,678

(22) Filed: Jun. 20, 2011

(65) Prior Publication Data

US 2012/0209946 A1 Aug. 16, 2012

Related U.S. Application Data

(60) Provisional application No. 61/442,701, filed on Feb. 14, 2011, provisional application No. 61/442,713, (Continued)

(51) Int. Cl.
*G06F 9/46* (2006.01)
*H04N 21/41* (2011.01)
(Continued)

(52) U.S. Cl.
CPC ......... *H04N 21/4126* (2013.01); *G06F 9/5011* (2013.01); *G06F 9/546* (2013.01);
(Continued)

(58) Field of Classification Search
CPC .............. H04N 21/233; H04N 21/4126; H04N 21/6175; H04N 21/439; G06F 9/546; G06F 9/5011
(Continued)

(56) References Cited

U.S. PATENT DOCUMENTS 5,257,386 A  10/1993 Saito
5,655,081 A  8/1997 Bonnell et al.
(Continued)

FOREIGN PATENT DOCUMENTS

CN  101788926 A  7/2010
CN  101911790 A  12/2010
(Continued)

OTHER PUBLICATIONS

"Windows Phone 7 with multitasking—coming soon", Feb. 15, 2011, http://mobile.dzone.com/articles/windows-phone-7.
(Continued)

*Primary Examiner* — Abdullahi E Salad
(74) *Attorney, Agent, or Firm* — Judy Yee; Micky Minhas

(57) ABSTRACT

The subject disclosure is directed towards a background transfer service that provides platform-level support for third party applications to queue data transfers to run in the background, including when the application is not running in the foreground. Applications may thus perform downloading and uploading tasks in the background; however the background transfer service manages the data transfer requests so as to limit each background application's ability (Continued)

to interfere with foreground application operations, that is, by controlling resource usage according to one or more policies.

20 Claims, 17 Drawing Sheets

Related U.S. Application Data filed on Feb. 14, 2011, provisional application No. 61/442,735, filed on Feb. 14, 2011, provisional application No. 61/442,740, filed on Feb. 14, 2011, provisional application No. 61/442,753, filed on Feb. 14, 2011.

(51) Int. Cl.
| | |
|---|---|
| H04N 21/233 | (2011.01) |
| H04N 21/439 | (2011.01) |
| H04N 21/61 | (2011.01) |
| G06F 9/50 | (2006.01) |
| G06F 9/54 | (2006.01) |

(52) U.S. Cl.
CPC ......... *H04N 21/233* (2013.01); *H04N 21/439* (2013.01); *H04N 21/6175* (2013.01)

(58) Field of Classification Search
USPC .......................................... 709/203; 718/103
See application file for complete search history.

(56) References Cited

U.S. PATENT DOCUMENTS

| | | | | |
|---|---|---|---|---|
| 5,938,723 | A * | 8/1999 | Hales, II | H04L 12/1822 348/E7.083 |
| 6,324,411 | B1 | 11/2001 | Genell | |
| 6,683,938 | B1 | 1/2004 | Henderson | |
| 6,874,145 | B1 | 3/2005 | Ye et al. | |
| 7,124,424 | B2 | 10/2006 | Gordon et al. | |
| 7,146,439 | B1 | 12/2006 | Ofer et al. | |
| 7,234,035 | B2 | 6/2007 | Jerding et al. | |
| 7,275,085 | B1 | 9/2007 | Tran | |
| 7,346,855 | B2 | 3/2008 | Hellyar et al. | |
| 7,512,952 | B1 | 3/2009 | Liu et al. | |
| 7,539,834 | B2 | 5/2009 | Jerding et al. | |
| 7,844,972 | B2 | 11/2010 | Raja et al. | |
| 7,912,896 | B2 | 3/2011 | Wolovitz et al. | |
| 7,971,204 | B2 | 6/2011 | Jackson et al. | |
| 8,082,008 | B2 | 12/2011 | Hoffman et al. | |
| 8,175,653 | B2 | 5/2012 | Smuga et al. | |
| 8,196,213 | B2 | 6/2012 | Klucher et al. | |
| 8,418,186 | B2 | 4/2013 | Jackson et al. | |
| 8,499,312 | B2 | 7/2013 | Naresh et al. | |
| 8,510,743 | B2 | 8/2013 | Hackborn et al. | |
| 8,515,797 | B2 | 8/2013 | Ernst et al. | |
| 8,943,520 | B1 * | 1/2015 | Roka | G06F 3/00 719/320 |
| 2002/0104097 | A1 | 8/2002 | Jerding et al. | |
| 2003/0061260 | A1 | 3/2003 | Rajkumar | |
| 2003/0117440 | A1 | 6/2003 | Hellyar et al. | |
| 2003/0227567 | A1 | 12/2003 | Plotnick et al. | |
| 2004/0102861 | A1 | 5/2004 | Han | |
| 2004/0194153 | A1 | 9/2004 | Garg | |
| 2005/0022157 | A1 | 1/2005 | Brendle et al. | |
| 2005/0026654 | A1 * | 2/2005 | Perez | G06F 9/5027 455/556.2 |
| 2005/0172326 | A1 | 8/2005 | Jerding et al. | |
| 2005/0278449 | A1 | 12/2005 | Moss et al. | |
| 2006/0136882 | A1 | 6/2006 | Noonan et al. | |
| 2006/0213754 | A1 | 9/2006 | Jarrett et al. | |
| 2006/0236368 | A1 | 10/2006 | Raja et al. | |
| 2006/0245237 | A1 * | 11/2006 | Nguyen et al. | 365/145 |
| 2006/0265726 | A1 | 11/2006 | Byun et al. | |
| 2006/0288336 | A1 | 12/2006 | Trowbridge et al. | |
| 2007/0038763 | A1 | 2/2007 | Oestvall | |
| 2007/0068367 | A1 | 3/2007 | Schmidt et al. | |
| 2007/0094665 | A1 | 4/2007 | Jackson | |
| 2007/0220445 | A1 | 9/2007 | Yach et al. | |
| 2007/0244586 | A1 | 10/2007 | Champion et al. | |
| 2007/0294699 | A1 | 12/2007 | Bahl et al. | |
| 2008/0052717 | A1 | 2/2008 | Lee | |
| 2008/0066006 | A1 * | 3/2008 | Kim | 715/781 |
| 2008/0082936 | A1 | 4/2008 | Helvick | |
| 2008/0125180 | A1 | 5/2008 | Hoffman et al. | |
| 2008/0154601 | A1 | 6/2008 | Stifelman et al. | |
| 2008/0172698 | A1 | 7/2008 | Berger et al. | |
| 2008/0222153 | A1 | 9/2008 | Naresh et al. | |
| 2009/0019095 | A1 * | 1/2009 | Asahara et al. | 707/203 |
| 2009/0028127 | A1 | 1/2009 | Walker et al. | |
| 2009/0113444 | A1 | 4/2009 | Hackborn et al. | |
| 2009/0227279 | A1 | 9/2009 | Yuki | |
| 2009/0249247 | A1 | 10/2009 | Tseng et al. | |
| 2009/0300192 | A1 | 12/2009 | Northrup | |
| 2009/0327481 | A1 | 12/2009 | Rickard et al. | |
| 2009/0327953 | A1 | 12/2009 | Honkala et al. | |
| 2010/0011446 | A1 | 1/2010 | Klucher et al. | |
| 2010/0115048 | A1 * | 5/2010 | Scahill | 709/213 |
| 2010/0138834 | A1 | 6/2010 | Agarwal | |
| 2010/0153877 | A1 | 6/2010 | Rautava | |
| 2010/0248787 | A1 | 9/2010 | Smuga et al. | |
| 2010/0250998 | A1 * | 9/2010 | Herdrich et al. | 713/501 |
| 2010/0262973 | A1 | 10/2010 | Ernst et al. | |
| 2010/0281481 | A1 | 11/2010 | Rainisto et al. | |
| 2011/0013516 | A1 * | 1/2011 | Black | H04L 43/0888 370/236 |
| 2011/0035554 | A1 * | 2/2011 | Watson et al. | 711/135 |
| 2011/0151885 | A1 | 6/2011 | Buyukkoc et al. | |
| 2011/0252430 | A1 * | 10/2011 | Chapman et al. | 718/107 |
| 2011/0258323 | A1 | 10/2011 | Jackson | |
| 2012/0102497 | A1 | 4/2012 | Stahl | |
| 2012/0102504 | A1 * | 4/2012 | Iyer et al. | 719/318 |
| 2012/0106463 | A1 | 5/2012 | McBride et al. | |
| 2012/0158827 | A1 | 6/2012 | Mathews | |
| 2012/0185532 | A1 | 7/2012 | Kristiansson et al. | |
| 2012/0209413 | A1 | 8/2012 | Xu et al. | |
| 2012/0209946 | A1 | 8/2012 | McClure et al. | |
| 2012/0210266 | A1 | 8/2012 | Jiang et al. | |
| 2012/0210321 | A1 | 8/2012 | Silva et al. | |
| 2012/0210326 | A1 | 8/2012 | Torr et al. | |
| 2012/0258722 | A1 | 10/2012 | Liu | |
| 2012/0265874 | A1 * | 10/2012 | Hoh et al. | 709/224 |
| 2013/0115990 | A1 * | 5/2013 | Koc et al. | 455/509 |
| 2014/0019873 | A1 * | 1/2014 | Gupta et al. | 715/744 |

FOREIGN PATENT DOCUMENTS

| | | |
|---|---|---|
| EP | 1929687 B1 | 5/2011 |
| TW | 200824365 A | 6/2008 |
| TW | 200917800 A | 4/2009 |
| TW | 201030506 A | 8/2010 |
| TW | 201037506 A | 10/2010 |
| WO | 2009097555 A2 | 8/2009 |

OTHER PUBLICATIONS

"International Search Report", Mailed Sep. 17, 2012, Application No. PCT/US2012/024790, Filed Date Feb. 12, 2012, pp. 1-9.

"International Search Report", Mailed Sep. 26, 2012, Application No. PCT/US2012/024789 , Filed Date Feb. 12, 2012, pp. 1-9.

"International Search Report", Mailed Aug. 31, 2012, Application No. PCT/US2012/024024 , Filed Date Feb. 6, 2012, pp. 1-10.

"Multitasking the Android way", retrieved at http://android-developers.blogspol.com/2010/04/multitasking-android- way.html, retrieved on Feb. 25, 2011, pp. 6.

Chen, Brian X., "Wired.com Explains: How Mobile Multitasking Works", Wired.com, Jul. 1, 2010, http://www.wired.com/gadgetlab/2010/07/mobile-multitasking-explainer.

(56) References Cited

OTHER PUBLICATIONS

"iOS Application Programming Guide", retrieved at http://developer.apple.com/library/ios/documentation/iphone/conceptual/iphoneosprogrammingguide/iPhoneAppProgrammingGuide.pdf, Nov. 15, 2010, pp. 114.

Allen, Mitch, "Palm WebOS Rough Cuts", retrieved at http://justinput.googlecode.com/files/Palm_webOS_Rough_Cuts.pdf, Palm webOS, 1st Edition, Sep. 2, 2009, pp. 302.

Fei, et al., "An Energy-aware Framework for Coordinated Dynamic Software Management in Mobile Computers", retrieved at http://www.engr.uconn.edu/~yfei/publications/files/mascots04.pdf, Oct. 2004, pp. 12.

Mikic-Rakic, et al., "Middleware for Software Architecture-Based Development in Distributed, Mobile, and Resource-Constrained Environments", retrieved at http://csse.usc.edu/~softarch/Prism/publications/Mikic-Rakic_Medvidovic_Jakobac.pdf, Feb. 2002, pp. 13.

Kunz, et al., "An Architecture for Adaptive Mobile Applications", retrieved at http://people.dsv.su.se/~liwei/project/conf25.pdf, May 13, 1999, pp. 12.

"BlackBerry Tablet OS SDK for Adobe AIR", retrieved at http://docs.blackberry.com/en/developers/deliverables/24118/BlackBerry_Tablet_OS_SDK_for_Adobe_AIR-Development_Guide--1449712-0112050519-001-0.9.2_Beta-US.pdf, Feb. 17, 2011, pp. 117.

"Running your app in the background (tombstoning)", retrieved at http://create.msdn.com/en-US/education/quickstarts/Running_your_App_in_the_Background_(Tombstoning), retrieved on Feb. 28, 2011, pp. 7.

"Samsung Galaxy S—Goodbye Task Killer", retrieved at http://forum.vodafone.co.uk/15/Galaxy-S/Samsung-Galaxy-S-Goodbye-Task-Killer/m-p/513640, retrieved on Feb. 28, 2011, pp. 5.

"Windows Phone and multitasking", retrieved at http://windowsphonesecrets.com/2010/05/20/windows-phone-and-multitasking/, retrieved on Feb. 28, 2011, pp. 2.

"Executing Code in the Background", retrieved at http://developer.apple.com/library/ios/#documentation/iphone/conceptual/iphoneosprogrammingguide/BackgroundExecution/BackgroundExecution.html, retrieved on Feb. 25, 2011, pp. 9.

"Application Fundamentals", retrieved at http://developer.android.com/guide/topics/fundamentals.html, retrieved on Feb. 25, 2011, pp. 7.

"How Multitasking Works in the New iPhone OS 4.0", retrieved at http://gizmodo.com/#!5512656/how-multitasking-works-in-the-new-iphone-os-40, retrieved on Feb. 25, 2011, pp. 6.

"WP7: Background Execution—Really?", retrieved at http://www.jayway.com/2011/01/11/wp7-background-execution-really/, retrieved on Feb. 25, 2011, pp. 8.

"iPhone OS 4.0 Background Services Explained", retrieved at http://thecircu.it/news/2010/4/9/iphone-os-40-background-services-explained.html, retrieved on Feb. 25, 2011, pp. 6.

Final Office Action cited in U.S. Appl. No. 13/162,936 dated Sep. 30, 2013, 19 pages.

Non-Final Office Action cited in U.S. Appl. No. 13/162,936, dated Feb. 15, 2013, 20 pages.

Reply to Non-Final Office Action cited in U.S. Appl. No. 13/162,936, dated Jul. 15, 2013, 10 pages.

"IOS", Retrieved from <<https://en.wikipedia.org/w/index.php?title=IOS&oldid=413766974>>, Feb. 13, 2011, 10 Pages.

"Supplementary Search Report Issued in European Patent Application No. 12747603.4", Mailed Date: Jul. 6, 2016, 6 Pages.

"Office Action Issued in European Patent Application No. 12747603.4", Mailed Date: Jul. 25, 2016, 10 Pages.

"First Office Action and Search Report Issued in Chinese Application No. 201210031687.6", Mailed Date: Feb. 3, 2016, 13 Pages.

U.S. Appl. No. 13/162,459, filed Jun. 16, 2011, Xu, et al.

U.S. Appl. No. 13/162,096, filed Jun. 16, 2011, Jiang, et al.

U.S. Appl. No. 13/164,497, filed Jun. 20, 2011, Silva, et al.

U.S. Appl. No. 13/162,936, filed Jun. 17, 2011, Torr, et al.

"Office Action and Search Report Received for Taiwan Patent Application No. 101102210", Mailed Date: Sep. 3, 2014, 13 Pages.

"Notice of Allowance Issued in Taiwan Patent Application No. 101102576", Mailed Date: Nov. 5, 2015, 6 Pages.

"Non-Final Office Action Received for U.S. Appl. No. 13/162,459", Mailed Date: Dec. 20, 2013, 13 Pages.

"Non-Final Office Action Received for U.S. Appl. No. 13/162,459", Mailed Date: Jun. 24, 2014, 15 Pages.

"Non-Final Office Action Received for U.S. Appl. No. 13/164,497", Mailed Date: Jan. 17, 2014, 18 Pages.

"Office Action Issued in Chinese Patent Application No. 201210031687.6", Mailed Date: Oct. 8, 2016, 8 Pages.

* cited by examiner

BACKGROUND TRANSFER SERVICE FOR APPLICATIONS ON MOBILE DEVICES

CROSS-REFERENCE TO RELATED APPLICATION

The present application claims priority to U.S. provisional patent application Ser. Nos. 61/442,701, 61/442,713, 61/442,735, 61/442,740 and 61/442,753, each filed Feb. 14, 2011 and hereby incorporated by reference. The present application is related to U.S. patent applications nos. 13/162, 096, 13/164,497, 13/162,459, 13/162,936, assigned to the assignee of the present invention, hereby incorporated by reference.

BACKGROUND

Allowing applications (e.g., third party applications) to run in the background of mobile devices and perform tasks allows malicious or poorly designed applications to drain the battery, consume bandwidth, and slow mobile phone/device performance. This is a problem on mobile devices where system resources are limited and foreground experiences are expected to run with full fidelity and responsiveness. In general, CPU, memory, and network bandwidth are limited system resources; moreover, bandwidth is highly variable in certain network conditions.

As a result, in one solution, application background processing is effectively disabled, in that the moment an application is removed from the foreground, that application is 'deactivated.' This means that applications currently rely on the user keeping them in the foreground to continue such tasks, including data transfers. This solution is generally undesirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a background transfer service is configured to run on a mobile device to control a transfer of network data communications for applications. The background transfer service manages application requests for data transfers based upon one or more policies that control resource usage of the background application data transfers in a way that limits interference with foreground application operations. In one implementation, the background transfer service is coupled to a download manager that is configured to make the remote connections to transfer data to or from a remote source to satisfy a transfer request.

In one aspect, a data sharing service moves or copies data transferred (downloaded) from the remote source into local storage accessible by an application. The data sharing service moves or copies data from storage accessible by an application for transferring (uploading) data to a remote source. In one aspect, an application instance manager provides notifications related to uninstall status, license revocation or reinstatement status of an application to the background transfer service, which may respectively cancel, pause and/or resume each pending transfer request for that application.

The policies may be directed towards allowing only a maximum number of outstanding transfers at a time, a data size-based limitation, connection rules (e.g., Wi-Fi versus cellular), and/or a bandwidth limitation. The policies may be based upon conditions, such as other application data transfer requests, available cellular service, Wi-Fi availability, desktop pass-through availability, power state, battery power level, and/or charging state.

In one aspect, data is transferred on behalf of one or more applications. This includes receiving a data transfer request from each application, and managing the data transfer request of each application to retain control of resource usage in transferring the data for that application. Managing of the data transfer request may include determining whether one or more transfer conditions are met, and if not, moving the request to a waiting state until the one or more transfer conditions are met. Managing of the data transfer request also may include determining whether to allow the request based upon the size of the data to transfer, throttling the data transfer based upon available bandwidth and/or the presence of streaming media in the foreground, prioritizing a foreground application data transfer over a background application data transfer, and/or detecting for a slow transfer state by checking whether a transfer rate is below a threshold, and if detected, waiting for a changed condition before resuming the transferring of the data for that application. If the associated application is currently executing (either in the foreground or the background), it is made aware of the current transfer state via notifications commonly referred to as "events" and can also query the transfer service to determine the current status of any of its requests (including those that have completed successfully or in error).

In one aspect, upon receiving information (e.g., a notification) indicating that an application is being uninstalled, managing the data transfer request comprises canceling each data transfer request corresponding to that application. Upon receiving information indicating that a license of an application is revoked, managing the data transfer request comprises pausing each data transfer request corresponding to that application; upon receiving information indicating that the license of the application is reinstated, managing the data transfer request comprises resuming each paused data transfer request corresponding to that application.

Upon receiving information indicating that an application has changed from a background application to a new foreground application, managing the data transfer request comprises re-prioritizing at least one pending data transfer request of the new foreground application. Upon receiving information indicating that an application has changed from a foreground application to a background application, managing the data transfer request may comprise re-prioritizing at least one pending data transfer request of the background application.

In one implementation, upon receiving a data transfer request comprising a request to transfer data on behalf of an application, information corresponding to the request is queued in a request queue. The information from the request queue is processed, comprising downloading data on behalf of the application into a file cache, including when the application is a background application. When downloaded, a service that has access rights to storage associated with the application is used to move or copy the data from the file cache to the isolated storage. The data can be moved or copied either incrementally while the transfer is in progress, or in a single operation once the transfer is complete; in one implementation, a move from the request store to the isolated store is done only when transfer is complete with no errors. Uploading operates similarly, e.g., an upload request is queued and processed, including communicating with a service that has rights to access the application's storage that contains the data to upload, so as to upload the data on behalf of the application. If the associated application is currently executing (either in the foreground or the background) it is periodically made aware of the transfer progress via notifications commonly referred to as "events" and can also query the transfer service for the current progress of any of its requests.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a background transfer service that provides platform-level support for applications to queue transfers to run in the background. This ensures that applications can perform appropriate data transfer tasks in the background, without offering applications complete flexibility to run whatever code they want. The background transfer service allows applications to queue requests, cancel requests, check request status and continue transferring (upload/download) content while the application is not running in the foreground.

Applications can download content essentially in parallel, e.g., via a round-robin fairness mechanism that provides resources to the applications in a fair way. An application may specify transfer preferences, however policies associated with the background transfer service control what applications can do, e.g., an application may only have some maximum number of outstanding transfers at a time, data transfer may be limited to some size when over cellular and Wi-Fi is unavailable or if external power is absent, a background application may not be allowed to use a 2G/EDGE cellular connection, different actions may be taken when on battery power, low power or when connected to AC/USB charging, and so forth.

Providing the transfer service at the platform-level thus enables the platform to maintain control over what transfer-related tasks applications can perform in the background, without providing applications with the full flexibility to run arbitrary code. Additionally, the background transfer service allows for control by first and third party applications with respect to the amount of bandwidth and/or other device resources being used, to preserve the foreground experience (where "first party" as used herein refers to trusted code such as provided by the operating system vendor, and third party refers to applications from vendors, regardless of their source or trustworthiness). Foreground applications can request additional bandwidth if necessary for heavy-bandwidth utilization activities, and the background transfer (depending on circumstances) may throttle the bandwidth to preserve the foreground experience so as to limit (e.g., reduce or avoid) interference with foreground application operations.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data transfer in general.

Figure 1:
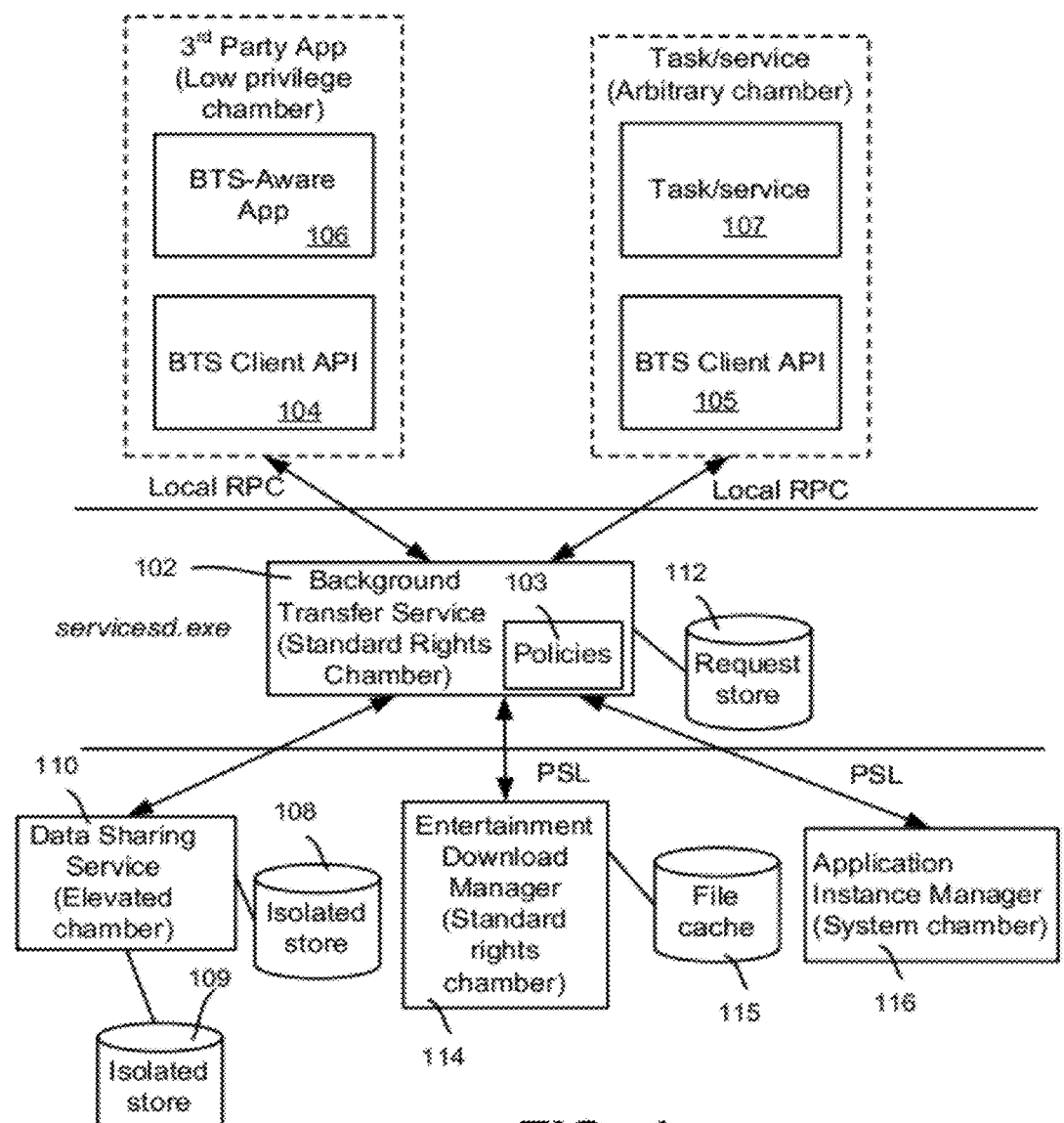
FIG. 1 is a block diagram representing example components used in performing background transfers of data for applications via a background transfer service.

In one implementation, as generally represented in FIG. 1, the background transfer service 102 (BTS) controls application data transfer requests according to one or more policies 103 associated with (e.g., incorporated into or externally coupled to) the background transfer service 102. The background transfer service 102, via a BTS client API 104, allows applications such as the application 106 to download/upload content from/to a network endpoint, even when the application 106 is not in the foreground (e.g., when deactivated or dehydrated). This is also available when an application is tombstoned (moved to the background rather than closed, with the operating system maintaining state information for later when the application returns to the foreground).

In general, foreground applications can add requests to the background transfer service's request queue; foreground/background applications can find requests in the background transfer service's request queue and remove requests from the background transfer service's request queue. These requests are subject to control by the background transfer service 102 according to the one or more policies 103. Other functions may be provided, such as to allow for status updates as described herein. As also shown in FIG. 1, tasks and/or services 107 (e.g., first party applications) may use the background service via a similar (or the same) API set, shown in FIG. 1 as API 105.

As described below, for security and the like, each application has its own local storage 108 and 109, which in one implementation is accessed via a data sharing service 110. Note that in FIG. 1, different components have different access rights represented by a chamber, e.g., the background transfer service runs in a standard rights chamber, applications run in a low privilege chamber, the data sharing service 110 runs in a standard chamber, and so on. The data sharing service 110 has the right to access the application's local storage 108 or 109 (restricted to only a particular folder in the storage), and the background transfer service 102 uses the data sharing service 110 to get downloaded data in, or to get data out for uploading. Using the data sharing service 110 (with elevated rights) to transfer data to and from the isolated stores provides additional security.

Figure 2:
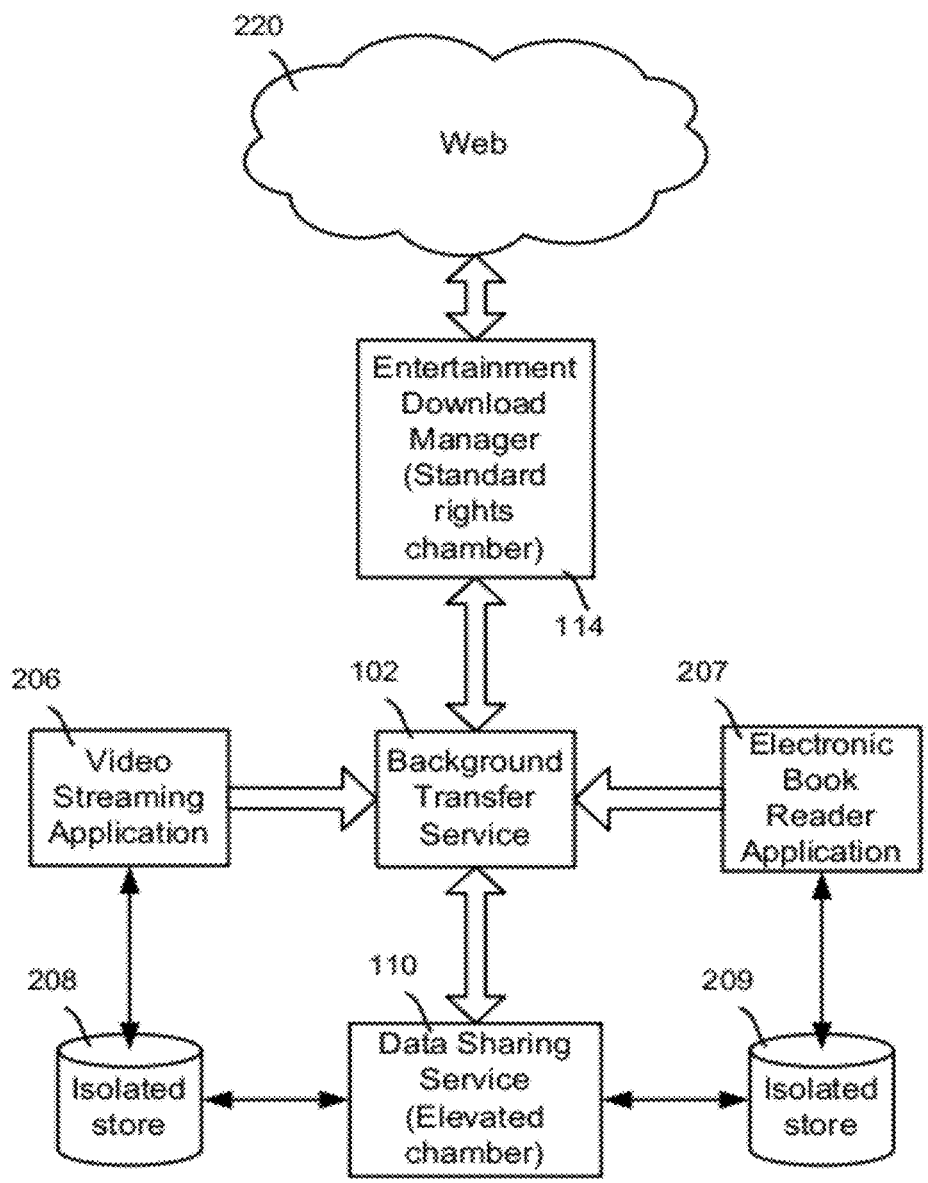
FIG. 2 is an example of applications using a background transfer service to download content.

As generally represented in FIG. 2, scenarios for background transfer from the web 220 or other network source include an application downloading extra levels or game content for games, media content download/upload for applications such as video streaming (e.g., application 206), e-readers (e.g., application 207), turn-by-turn navigators, and so forth. Each application (e.g., 206 and 207) may have its own isolated store, shown in FIG. 2 as 208 and 209, respectively.

It should be noted that a foreground application may use the background transfer service 102. In such a situation, the background transfer service 102 may apply a different policy or have other rules, e.g., to prioritize the foreground application transfer requests over those of background applications, use different limits (or even no limits) and so forth. This also applies when a background application is using the service and gets changed to the foreground application; its queued requests are moved up in priority (other application requests may be paused), limits may be changed or not enforced, and so forth.

As will be understood, transfers through the background transfer service 102 may proceed in parallel with reasonable fairness, and without starving one another, as controlled by the service 102. As a result, a large transfer does not block further requests indefinitely, and the background transfer service 102 may enforce hard restrictions on a transfer's content sizes while minimizing disruption to background audio streaming, foreground video streaming, gaming, and foreground activities that use the network, for example. Note that audio streaming is sensitive to resource starvation, and the background transfer service attempts to not interrupt this scenario, while not starving resource-intensive applications nor degrading foreground experiences that require network bandwidth, e.g., music streaming, multiplayer gaming scenarios, gaming scenarios, video streaming, a browser, social networks, and so forth. At the same time, the service may adapt and/or otherwise operate to maximize battery life through efficient resource use, including battery and bandwidth. Cost awareness may be another consideration, e.g., to not allow a rogue or poorly written application to use too much of a user's limited data plan on a cellular connection.

Returning to the example implementation/architecture generally represented in FIG. 1, the background transfer service 102 (BTS) may comprise a Windows® Phone service running inside servicesd.exe in the standard rights chamber. In this example RPC (Remote Procedure Call) is used as the IPC (interprocess communication) mechanism between background transfer service clients 106, 107 and background transfer service 102. The service 102 thus offers an RPC interface that is accessible by low privileged chamber BTS-aware (e.g., Yamanote) applications as well as other higher-privileged processes. Note that local RPC, PSL (process server library) and IPC mechanisms are available in the Windows® Phone platform.

The RPC interface exposes the APIs 104, 105 for queuing, canceling and querying the status of an individual transfer. The RPC interface also exposes the APIs 104, 105 for RPC clients to get notifications regarding the progress and completion of a transfer. The background transfer service 102 is persists a transfer request in its request store 112 until the conditions are right to delete the request (e.g., the response has been successfully sent to the requestor). The request store 112 comprises a persistent store in the file system where the background transfer service saves the application's transfer request.

In one implementation, the background transfer service 102 may use the services of an entertainment download manager 114 (EDM) for managing http/https transfer requests such as starting, canceling and pausing a request. While the entertainment download manager 114 is exemplified herein as a separate component, in an alternative implementation, the entertainment download manager 114 (e.g., its functionality) or part thereof may be incorporated into the background transfer service 102, or vice-versa. Thus, as used herein, the entertainment download manager 114 may be a separate component (in whole or in part), or may be a sub-part of the background transfer service 102, (or vice-versa).

The entertainment download manager 114 is essentially a straightforward queuing service with round robin logic (e.g., dividing available parallel slots among the one or more requesting applications) that processes requests, provides for progress callbacks/notifications, and so forth. The entertainment download manager 114 has its own file cache 115 and request queue, and in general maintains state data to handle the operations of communicating with the endpoints to transfer the content to and from the endpoints, using retry mechanisms as needed, and so forth. The entertainment download manager 114 also may watch for notifications from a resource manager component to vary (e.g., in one implementation, pause certain ones of) the transfers when an application changes from background to foreground. As instructed by the background transfer service 102, the data sharing service 110 moves/copies data from/to the file cache 115 to the corresponding isolated storage for each application as appropriate via a transfer folder.

In addition, the background transfer service 102 uses an application instance manager 116 (AIM) to receive notifications regarding application uninstall and license revocation and reinstatement. To this end, the application instance manager 116 comprises a component that sends notifications about application uninstall and license revoke/reinstatement to the background transfer service 102.

As generally represented in FIG. 1, the BTS-aware (e.g., third party) application 106 uses the managed APIs 104 provided by the platform. A task/service 107 may be a headless task or another background service that is part of the platform. In one implementation, the background transfer service comprises a platform background service (e.g., hosted in servicesd.exe, a platform component process that hosts multiple services), which comprises the RPC server side component implementing the transfer APIs. The background transfer service client API may be a platform-native DLL that exposes the native background transfer service APIs, which uses local RPC to communicate with background transfer service.

Also shown in FIG. 1, in one implementation the data sharing service 110 comprises a platform background service that serves as a secure broker for platform components to access the low privileged application's isolated storage 108. The entertainment download manager 114 comprises a background service used by platform components to transfer content. One design of the background transfer service 102 uses the entertainment download manager 114 for interfacing with wininet and performing the actual http file transfers.

The persistent store choice for the background transfer service may comprise any suitable data structure/mechanism, including any suitable database, the registry, or one file per request. In the platform, EDB (an embedded database engine) is used for such a mechanism, in part because it provides reasonable support for likely request patterns (e.g., hundreds of requests, creation/deletion over time), and because it supports transactions.

Figure 3:
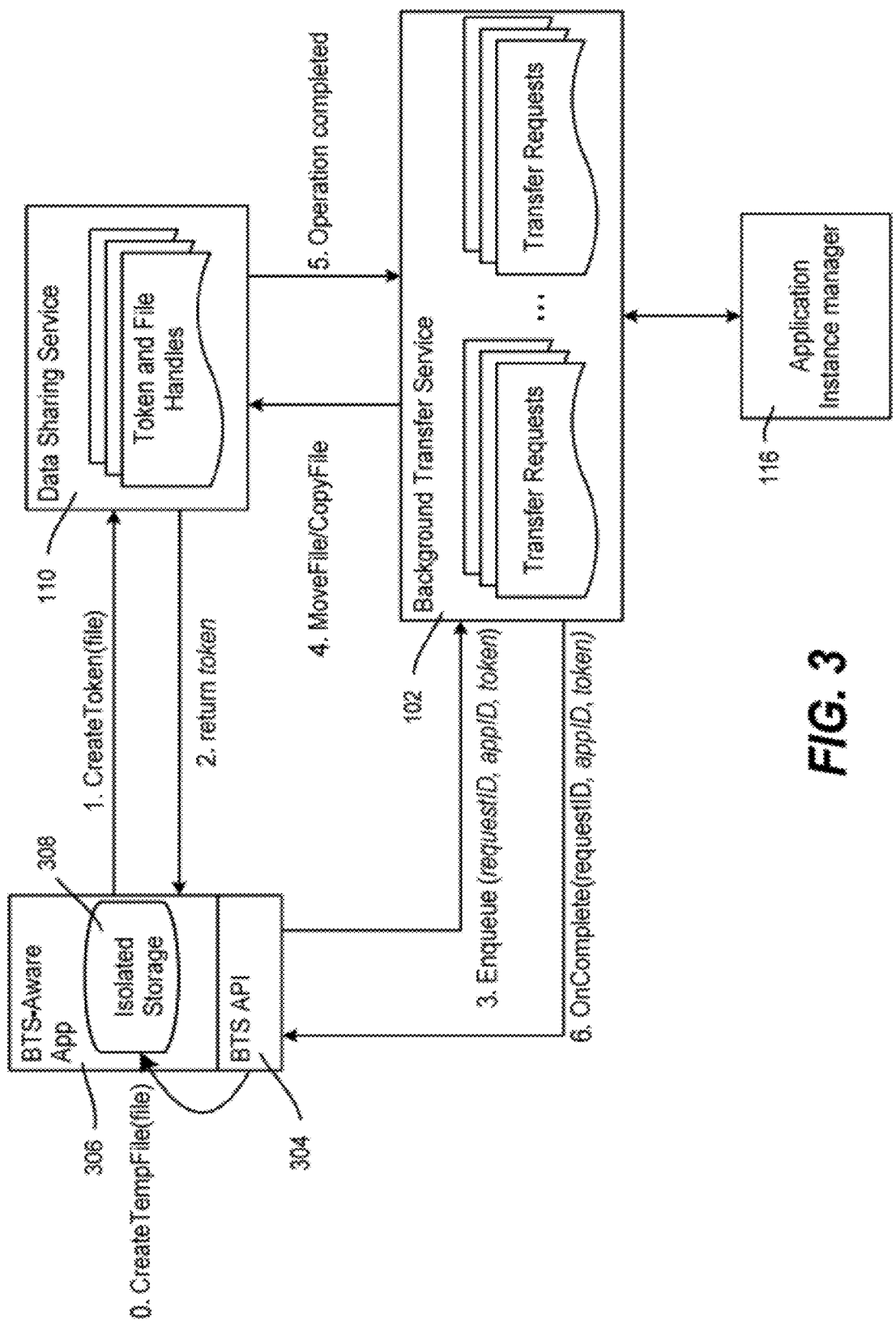
FIG. 3 is a dataflow diagram representing example components and data communicated in performing background transfers of data.

FIG. 3 provides a system overview along with a numbered flow of operations. The background transfer service client API 304 comprises a library that an application 306 references to gain access to the background transfer service 102. The client API 304 creates a temporary file (inside the application's isolated storage 308, shown within the application for convenience) for download requests, and renames/moves this temporary file to the desired filename upon download completion. Note that in one implementation, moving is not a double-write on the file system as long as it does not cross volumes and thus improves performance. P2 caching may be enabled to avoid flushing to flash/SD unless needed.

As represented in FIG. 3 by labeled arrows one (1) and two (2), the application 306 (via the client API 304) requests a token for a given file handle from the data sharing service 110 (via RPC), and enqueues (labeled arrow three (3)) or dequeues requests by providing the request information (file handle's token, requestID) to the background transfer service (via RPC).

The data sharing service 110 provides a mechanism for creating a handle to a file within an application's isolated storage 308, and for granting access to the aforementioned handle to the background transfer service 102 through the exchange of a shared secret (token). These are represented in FIG. 3 by labeled arrows four (4) and five (5).

The background transfer service 102 is responsible for managing the application request queues, preserving the state of requests across the lifetime the of application (on the device), managing queue priority and management, and interfacing with the data sharing service 110 for copying from or moving file to application storage (by providing a token), as described above. Also, the background transfer service 102 via the client API 304 relays progress events/queries, such as completion, and fatal errors, as represented via labeled arrow six (6).

The application instance manager 116 provides an API or the like to get information about a task instance that a background service 102 may need to validate the identity of a task instance and to make policy decisions about whether to accept a request or not. The background transfer service 120 subscribes to and fulfills requests from the application instance manager 116 for uninstall and revocation and other application lifecycle events. The application instance manager 116 informs the background transfer service 102 when an application registered by the background transfer service with it is uninstalled, its license revoked or reinstated. The background transfer service 102 cancels outstanding requests of an application when the application is being uninstalled, and pauses the requests made by an application when the license of the application is revoked. The background transfer service 102 resumes these requests when the application license is reinstated.

In one implementation, a resource manager may be used to control the pausing and resumption of the background transfer service 102. The application instance manager 116 may disable the entertainment download manager 114. Because requests are looked up using a combination of the requestID and application ID, to ensure sandboxing of request look-ups and to ensure that the application ID is not provided by the application, the background transfer service has some means to determine this information. The product id of the application may be obtained by calling the security system, given the process ID of the application.

Turning to additional details of one example implementation, a first step that the background transfer service client takes is to establish an RPC connection to the background transfer service server. This may be done using the sequence in FIG. 4. The request ID is assumed to be unique to the system and is enforced by the background transfer service 102. Note that the caller can specify whether the request ID is an existing request, in which case the background transfer service will verify the product ID of the caller, (using the caller process ID obtained from RPC run time and use that to retrieve the product ID from the accounts database) and cross-check that with the existing request ID's product ID. The background transfer service 102 can also obtain the product ID of the RPC caller from the application instance manager using an API call, e.g., the GetTaskInstanceInformation API, however that requires the task ID of the client process to be passed in to the API. The task ID can be passed in through the RPC for BtsCreateBackgroundTransferRequest from the background transfer service client library. The background transfer service may independently verify the validity of the task ID by comparing the process ID of the task process obtained from GetTaskInstanceInformation with the caller process ID obtained from RPC.

Figure 5:
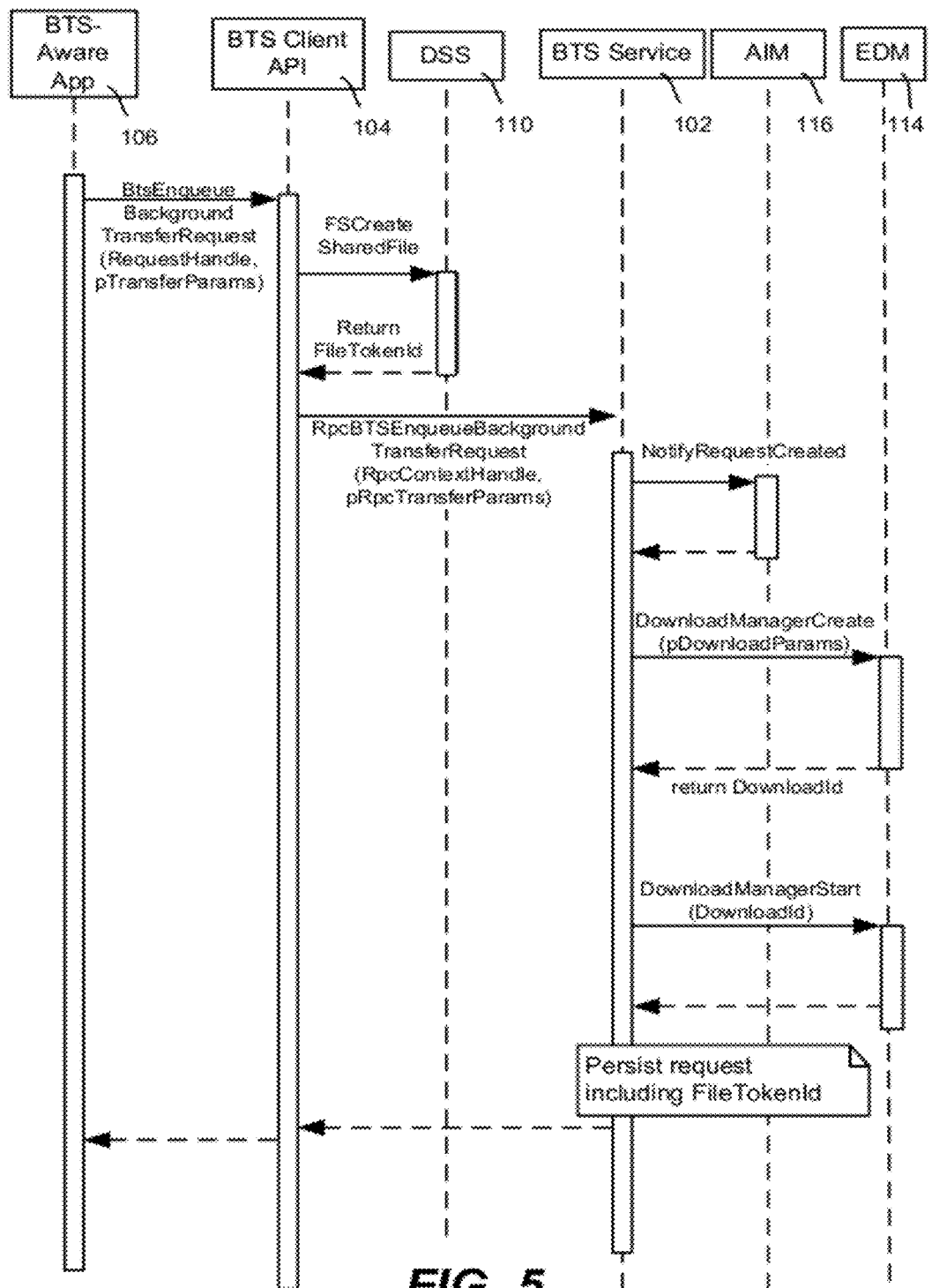
FIG. 5 is an example timing sequence/dataflow diagram showing how an application enqueues a background transfer request.

Enqueuing a background transfer request is generally represented in FIG. 5. In one implementation, the background transfer service 102 supports an application to queue a file transfer request using a combination of a unique request ID string, URI, a transfer file name and an HTTP verb. Supported verbs include GET (for download), and POST (for upload). In addition, the application can specify an allowed set of custom HTTP headers to be added to the request). The application can also specify whether the transfer requires the device to be plugged into AC power (including USB charging) and/or Wi-Fi.

An example sequence diagram for the enqueue request is shown in FIG. 5. In addition, the server side flow of the API is also shown. The different components shown in the diagram have been described above.

Figure 4:
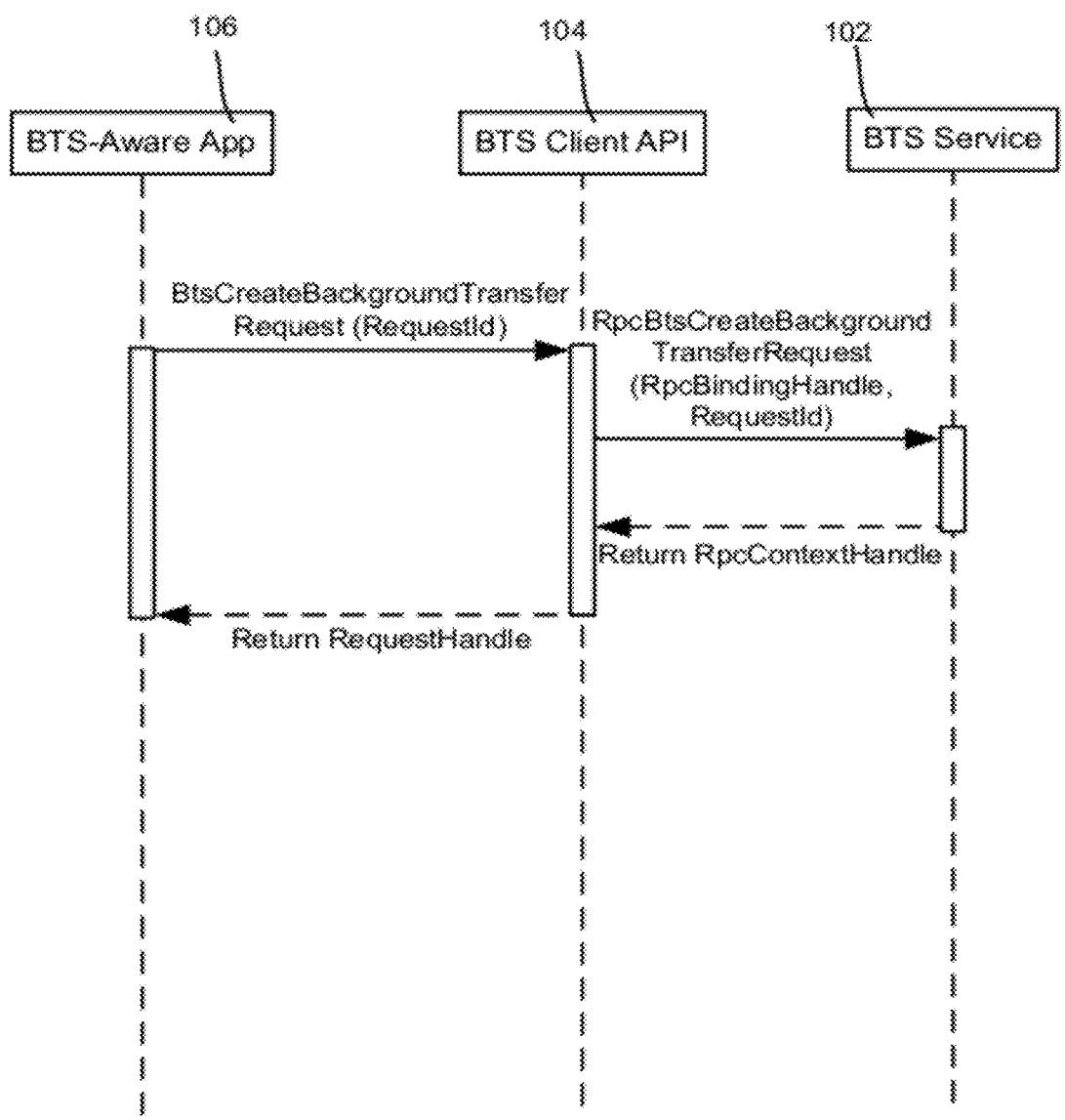
FIG. 4 is an example timing sequence/dataflow diagram showing how an application establishes a connection to the background transfer service.

Note that the background transfer service client API 104 uses the RPC context handle obtained in FIG. 4 to communicate with the background transfer service 102. The background transfer service client API 104 uses the data sharing service's API to translate the transfer file name into a file token ID string because the background transfer service (running in the standard rights chamber) cannot access the application's isolated storage directly. The background transfer service API calls into the background transfer service 102 through local (sync) RPC passing in the RPC context handle created before and the transfer parameters mentioned above, which includes the file token ID.

When the background transfer service 102 gets the RPC call, the service checks to see if the conditions are right to send the request to the entertainment download manager 114, or whether the background transfer service instead is to enqueue the request and send it to the entertainment download manager 114 later, when the conditions are right.

Figure 6A:
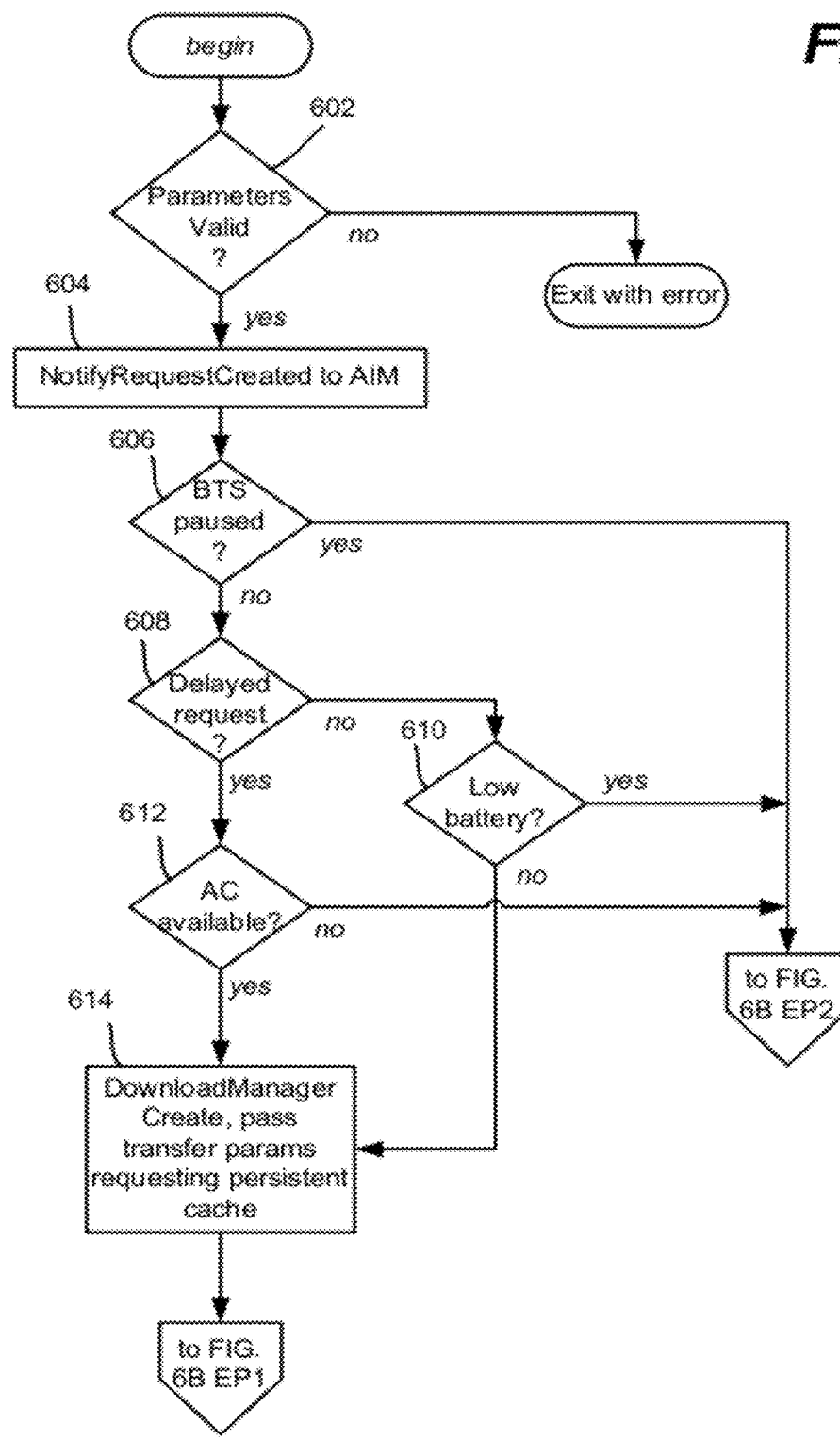
FIGS. 6A and 6B comprise a flow diagram showing example steps for checking conditions and based upon those conditions, delaying or requesting transfer of data.
Figure 6B:
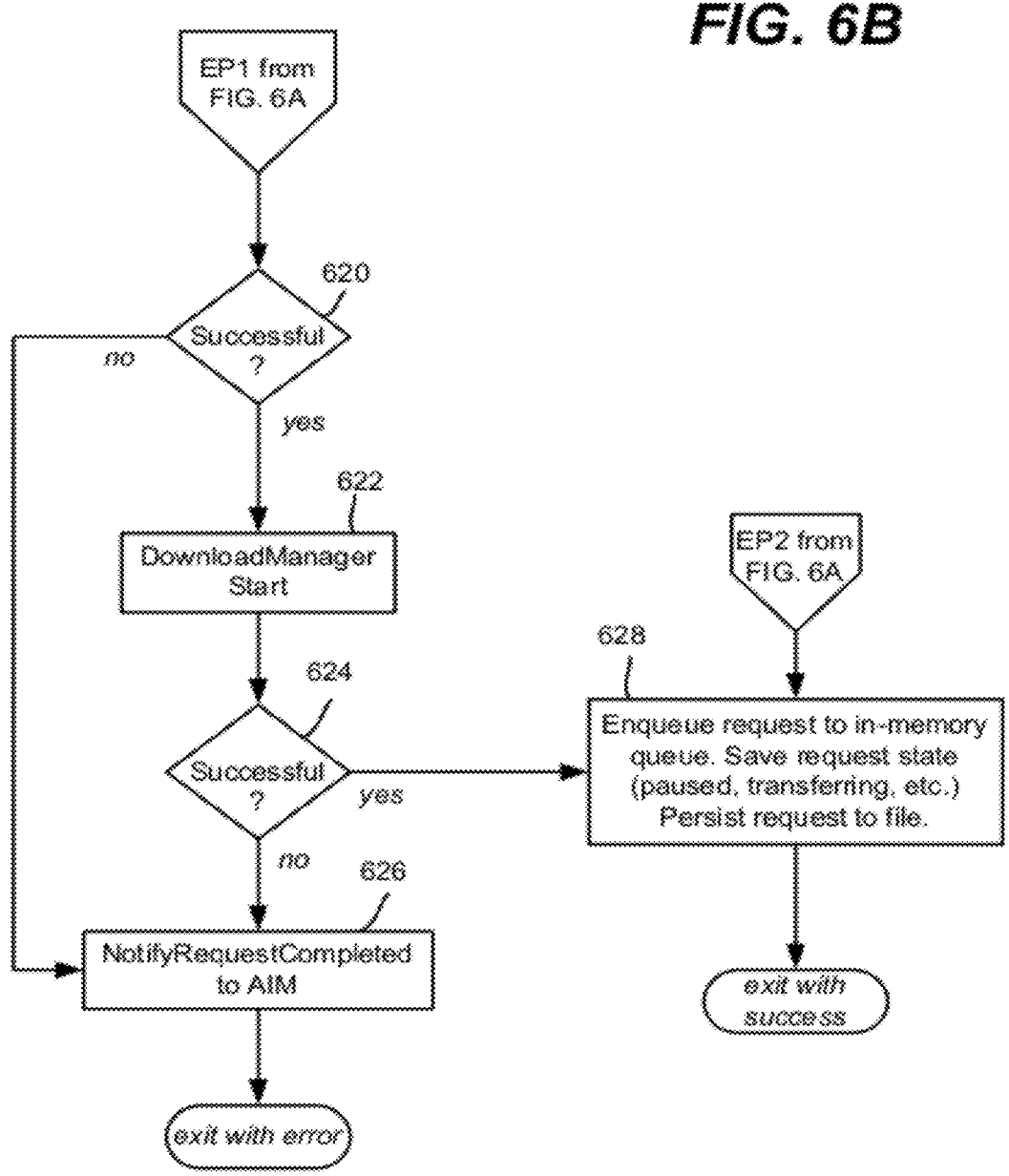

FIGS. 6A and 6B exemplify different conditions that may be checked. For example, step 602 validates the parameters, and only if validated is step 604 performed for notifying the application instance manager 116.

To help optimize battery usage, the background transfer service allows an application to specify that a transfer request be delayed until AC power is available. In that case, the background transfer service only starts the transfer process with the entertainment download manager 114 when the phone is on AC power (e.g., USB powered). In addition, the background transfer service starts monitoring for a power state change, and if it turns to battery, the ongoing transfers may be paused in the entertainment download manager 114, until resumed when the phone returns to AC power. Further, the background transfer service monitors for a low battery state, as well as checking the battery state at startup. If the background transfer service gets a low battery state notification, it will pause transfers that it queued with the entertainment download manager 114. The transfers are resumed when the battery state transitions from low.

As represented via steps 606, 608, 610 and 612 if the, request is not delayed and a low battery condition exists (also when a "battery saver mode" is on), or the request is delayed and AC power is not available, the process branches to step 628 (entry point EP2) of FIG. 6B as described below. Otherwise, step 614 represents preparing the download manager and continuing to step 620 (entry point EP1) of FIG. 6B.

Step 628 represents the successful branch of step 624 or the branch of one of the above-described condition sets (steps 606, 608, 610 and 612). Step 628 enqueues the request to an in-memory queue, and persists the request.

Step 628 represents the successful branch of step 624 or the branch of one of the above-described condition sets (steps 606, 608, 610 and 612). Step 628 enqueues the request to an in-memory queue, preserves the request and persists the request.

Returning to FIG. 5, the background transfer service calls into the application instance manager 116 to notify that a request has been accepted using NotifyRequestCreated( ), corresponding to step 604 of FIG. 6A. This API may also return the license status of the application, which will be used to determine if the transfer can be started, by calling into the entertainment download manager 114. If there are failures in this background transfer service API further down, the application instance manager 116 is informed using NotifyRequestCompleted( ), corresponding to step 626 of FIG. 6B.

The background transfer service calls into the entertainment download manager 114 API, DownloadManagerCreate, to create a download ID. The transfer parameters may be passed through to the entertainment download manager 114 API directly, e.g., with DM_TYPE_CONTENT|DM_ PRIORITY_OPPORTUNISTIC|DM_PERSIST_ LIBRARY|DM_FETCH_CACHED|DM_DONT_WANT_ RESPONSE_STREAM flags set. The transfer parameters specify the policies, namely allow 3G cellular transfers and Wi-Fi transfers or allow Wi-Fi only transfers. It also specifies the method of transfer, POST or GET. In addition, the application product ID (GUID) as well as media key (same as application request ID), may be specified. The application product ID is used by the entertainment download manager 114 to round-robin transfers across applications to mitigate starvation. The media key is used to have the entertainment download manager 114 store a downloaded file to the entertainment download manager 114 persistent cache as a unique file. The background transfer service 102 moves the file from the cache to the application's store when the transfer is successful, e.g., using MoveFile support in the data sharing service 110. Note that the MoveFile API does not copy the data when the move is not across different logical volumes.

In response to DownloadManagerCreate, the entertainment download manager 114 returns a download ID which the background transfer service saves in memory (download IDs are not valid across reboots) together with the rest of the transfer request parameters. The background transfer service then calls the entertainment download manager 114, DownloadManagerStart, and starts the transfer process.

Once the call to the entertainment download manager 114 for starting the transfer is successful, the background transfer service saves the request including the target file token ID associated with the request to EDB (corresponding to step 628). Note that the data sharing service 110 supports persisting file token IDs across reboots.

There may be a per-application limit of outstanding requests (e.g., a default of five) which if present is enforced by the background transfer service. A registry setting or the like may override the default limit. This prevents one application from consuming too much of the system resources, such as network bandwidth, battery, background transfer service memory, transfer file space and persistent store space.

Figure 7:
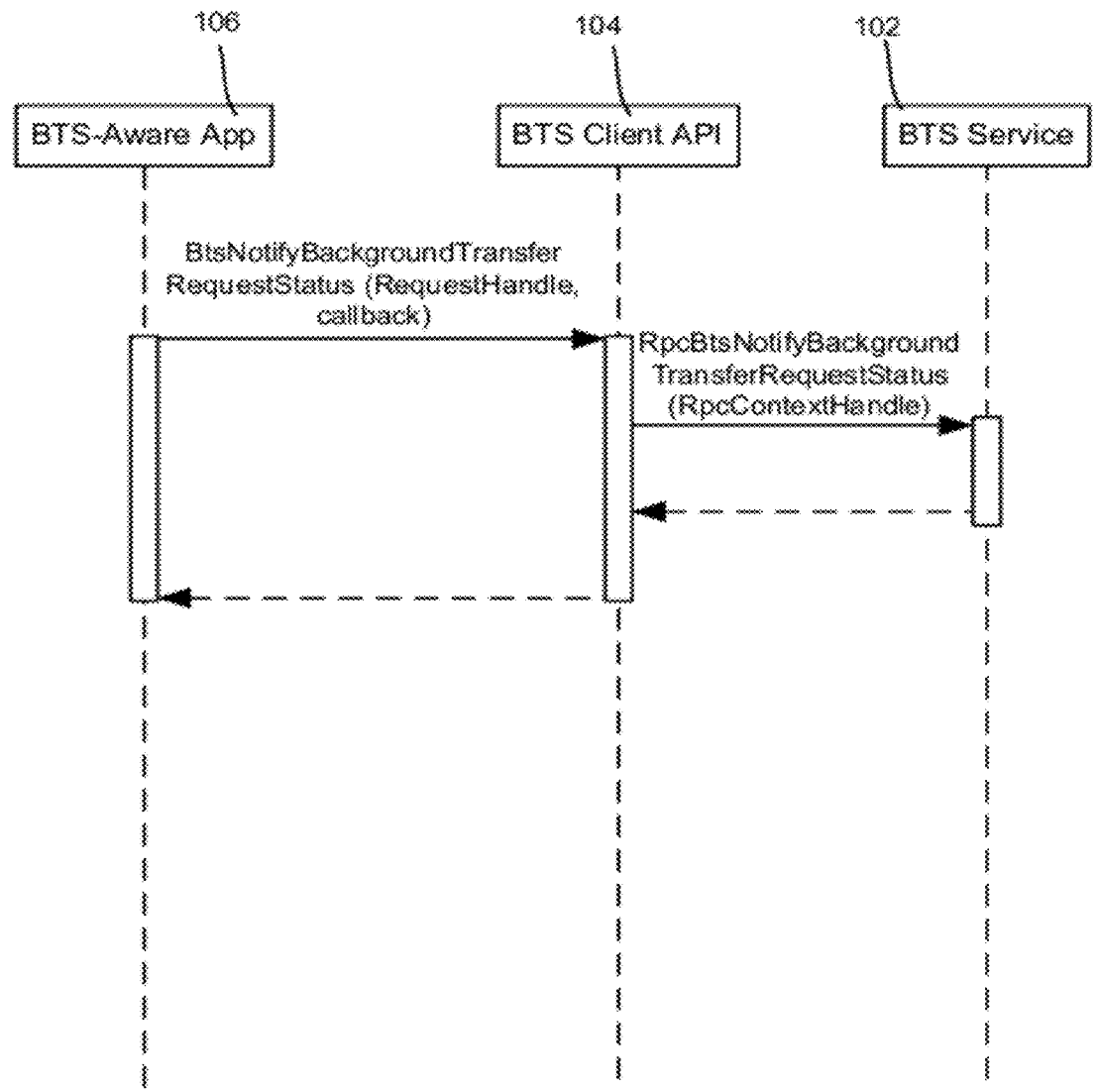
FIG. 7 is an example timing sequence/dataflow diagram showing calling into the background transfer service to register for progress/completed notifications.

A background transfer service client can optionally subscribe to receive transfer progress notifications and an application callback will be made at specific completion points of the transfer. The points at which the callback will be made depend on the entertainment download manager 114's callback into background transfer service, which occurs at intervals dependent on the size of the file being transferred. As represented in FIG. 7, the background transfer service client may use the RPC context handle obtained in the creation step to make an RPC call into background transfer service to register for progress/completed notifications. This RPC may be an asynchronous RPC, since it is undesirable to have any dedicated threads blocked in the client or in the server. Note that notifications can arrive at a later point in time after the asynchronous RPC call is made.

Figure 8:
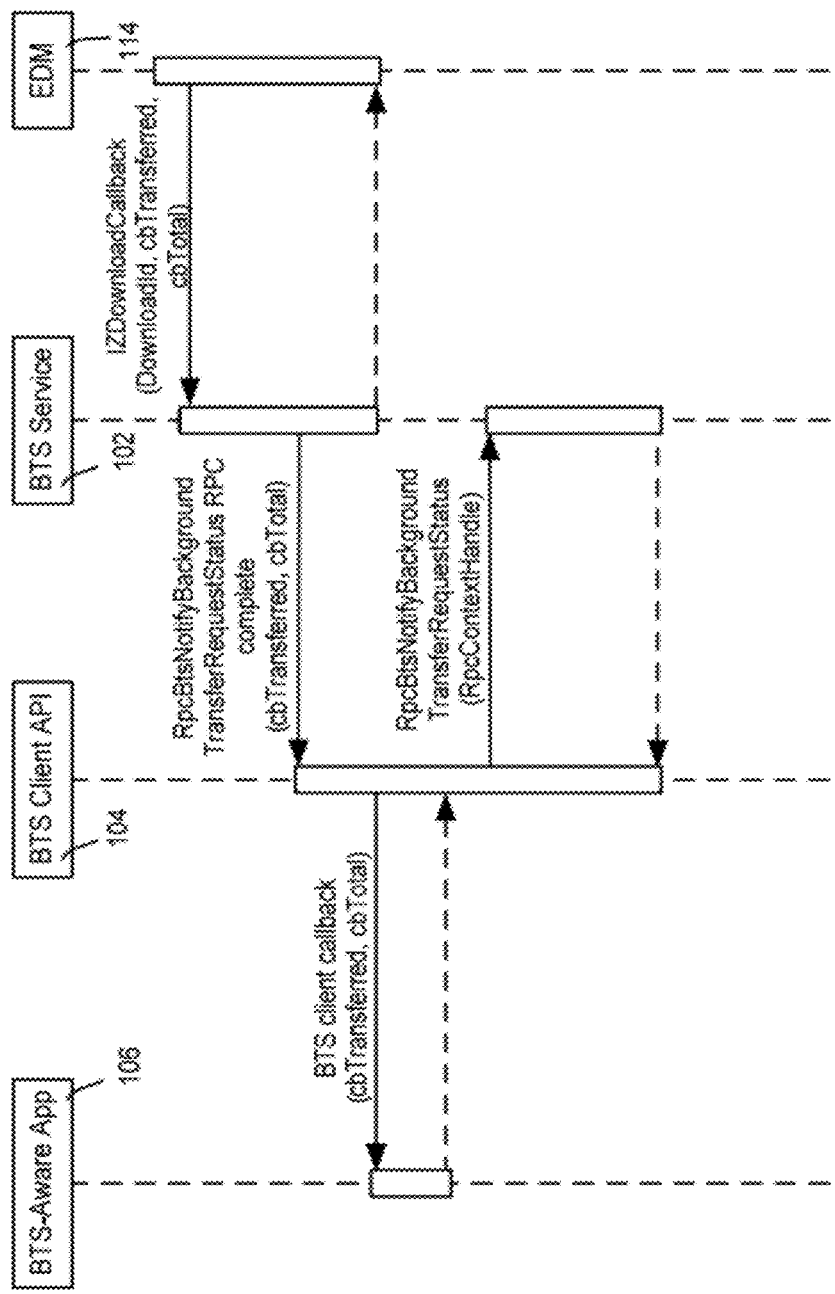
FIG. 8 is a timing sequence/dataflow diagram showing example operations related to obtaining a transfer progress notification.
Figure 9:
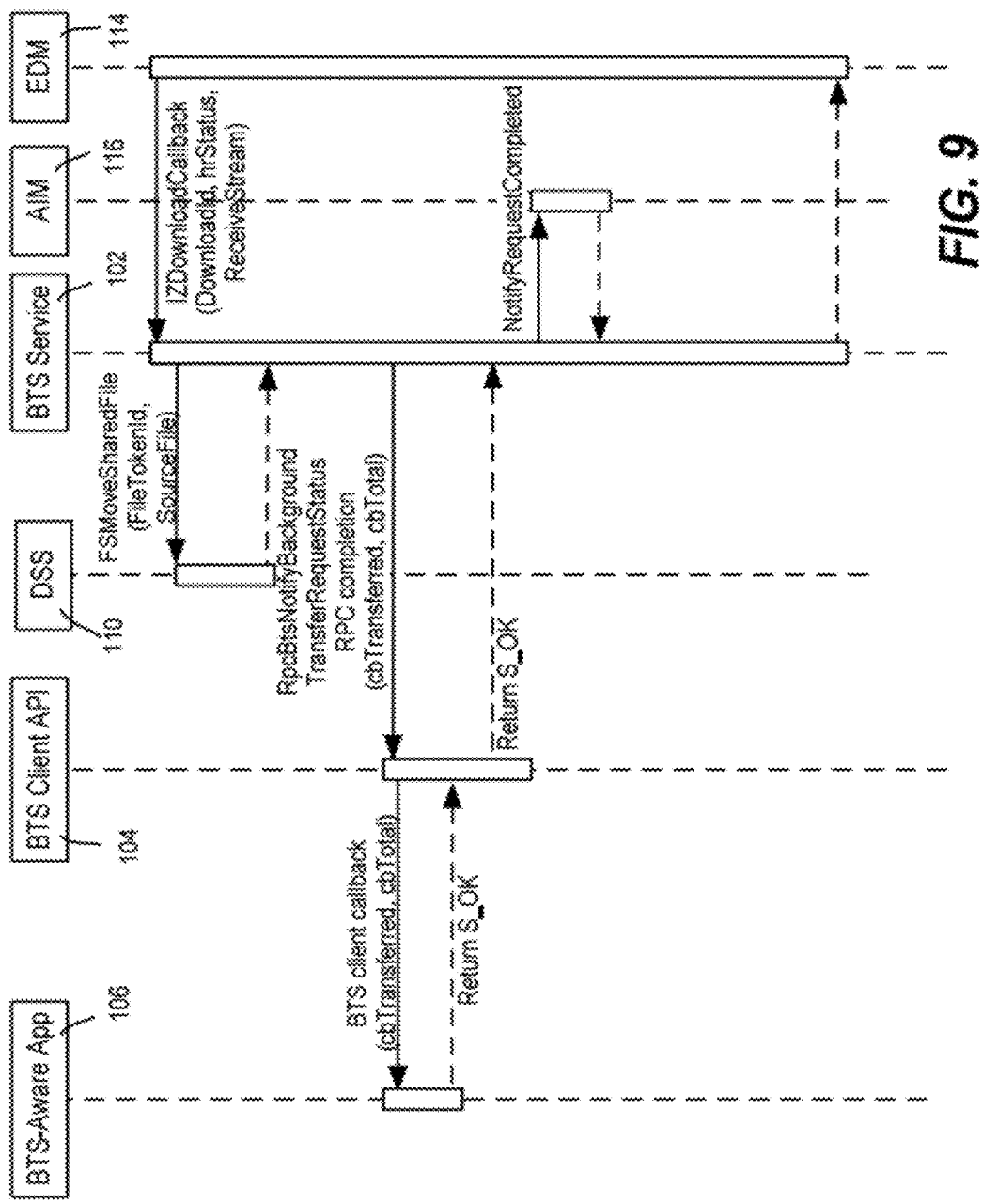
FIG. 9 is a timing sequence/dataflow diagram showing example operations related to obtaining a completion notification.

FIGS. 8 and 9 represent the transfer progress and completion notifications, respectively. Note that the background transfer service 102 listens to the progress and completion notifications from the entertainment download manager 114. In the completion case, the background transfer service uses the services of the data sharing service 110 to move the transfer file into the application's isolated storage in the case of a download. Once the request is delivered to the client, the background transfer service 102 also deletes it from its persistent store. The application instance manager 116 is also notified that the request has been deleted, e.g., using NotifyRequestDeleted( ).

Figure 10:
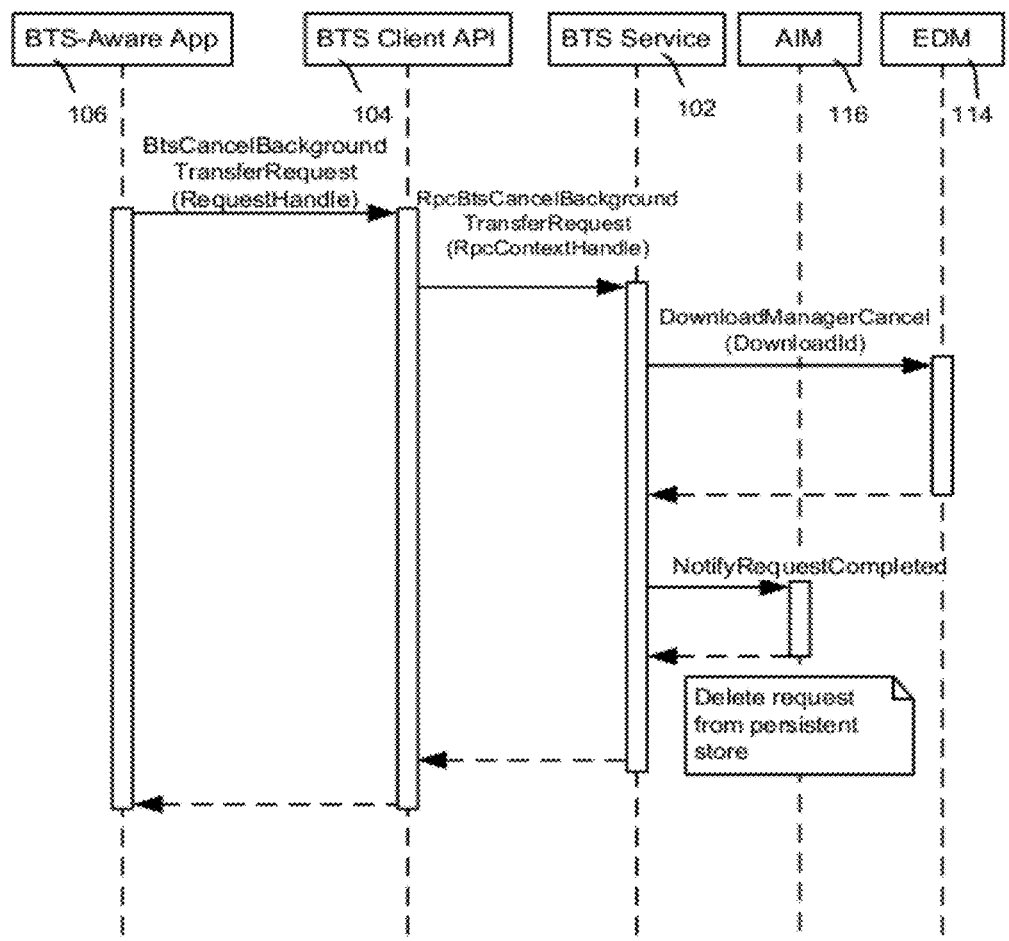
FIG. 10 is a timing sequence/dataflow diagram showing example operations related to canceling a background transfer request.

An application can cancel a transfer request that it queued at any point in time; the sequence diagram for the cancel operation is shown in FIG. 10. The request is identified using the opaque RPC context handle which was received as part of the creation step. Once the cancel request is successful, the transfer request is deleted from memory and the persistent store. The application instance manager 116 is also notified that the request has been completed using NotifyRequestCompleted( ).

Figure 11:
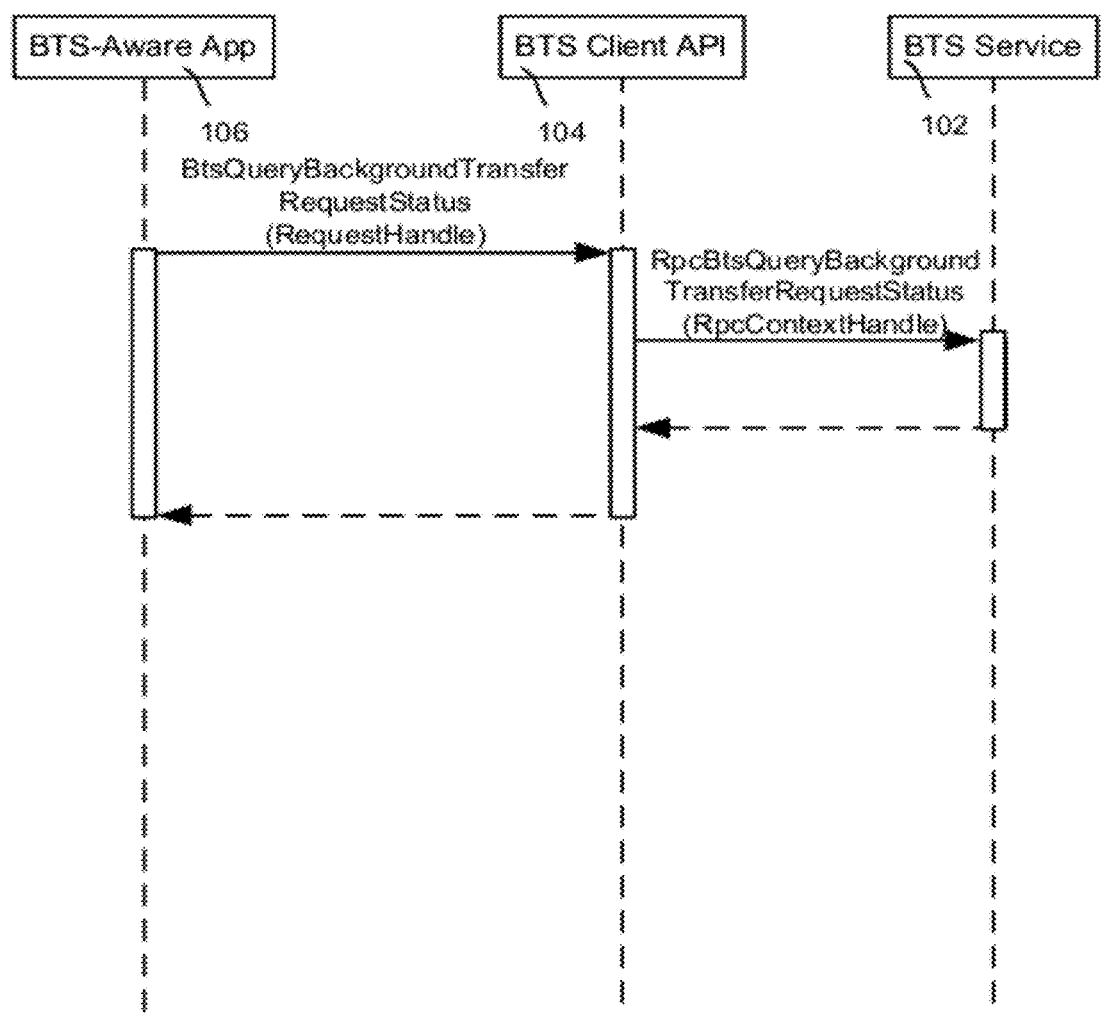
FIG. 11 is a timing sequence/dataflow diagram showing example operations related to querying for background transfer request status.

An application may query the status of a transfer request (FIG. 11) that it queued using the request handle received after calling the BtsCreateBackgroundTransferRequest API. The following information may be returned from the latest cached result of the entertainment download manager 114 state in background transfer service:

Request state.
Hr status of the transfer.
Http status of the transfer
Number of bytes received.
Total number of bytes expected to be received.
Number of bytes sent.
Total number of bytes expected to be sent.

An application can close the request handle at any point in time. Closing the request handle does not cancel the request but tears down the RPC connection between the client process and the server process. If the client process dies without closing the handle, the RPC run time notifies the background transfer service 102 using context handle rundown callback.

An application can enumerate the outstanding requests queued by itself thus far using an API ("BtsEnumBackgroundTransferRequests"). This is useful when an application has queued a few requests with the background transfer service, got deactivated and comes back later on to find the status of the requests queued by it. The API only returns the request information pertinent to the caller application product ID.

Figure 12:
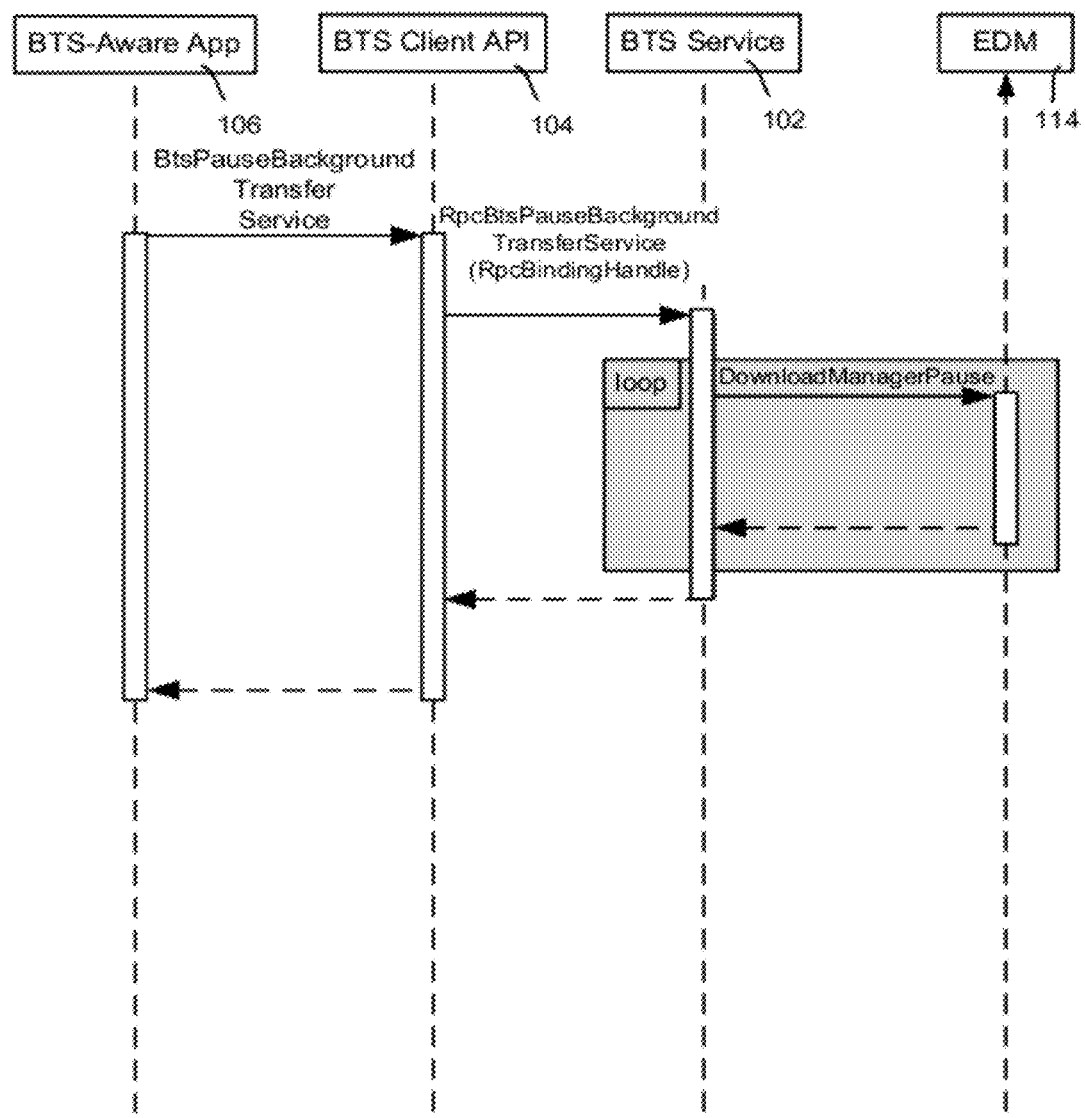
FIG. 12 is a timing sequence/dataflow diagram showing example operations related to pausing a background transfer.

FIG. 12 is directed towards pausing the background transfer service 102. A platform component such as a resource manager can request that the background transfer service 102 be paused (e.g., if it detects that one or more foreground networking applications are running). In response, the background transfer service enumerates the transfers that are queued into the entertainment download manager 114 using DownloadManagerEnumDownloads API, with the task ID specified as part of each DownloadManagerCreate call. Once the transfers are enumerated, they may be paused, e.g., one-by-one by calling the DownloadManagerPause API. A DownloadManagerPauseTaskDownloads API may be provided in the entertainment download manager 114 to make the above sequence doable with one API call. Once the background transfer service has been paused, new enqueue requests are paused as well. They are resumed only after a specific resume API call from a platform component.

In one implementation, there need not be a timer in the background transfer service 102 for automatic resumption from a pause. The resource manager ensures that the application is in the foreground, still running, and is not under a lock screen. A crash of the resource manager reboots the mobile device because it is hosted in a shell program. The background transfer service 102 ensures that only an appropriate chamber caller can call the pause API. Note that with a timer, an application is able to repeatedly call into the API, whereby a timer provides little benefit yet has some effect on battery life as well as other drawbacks.

Figure 13:
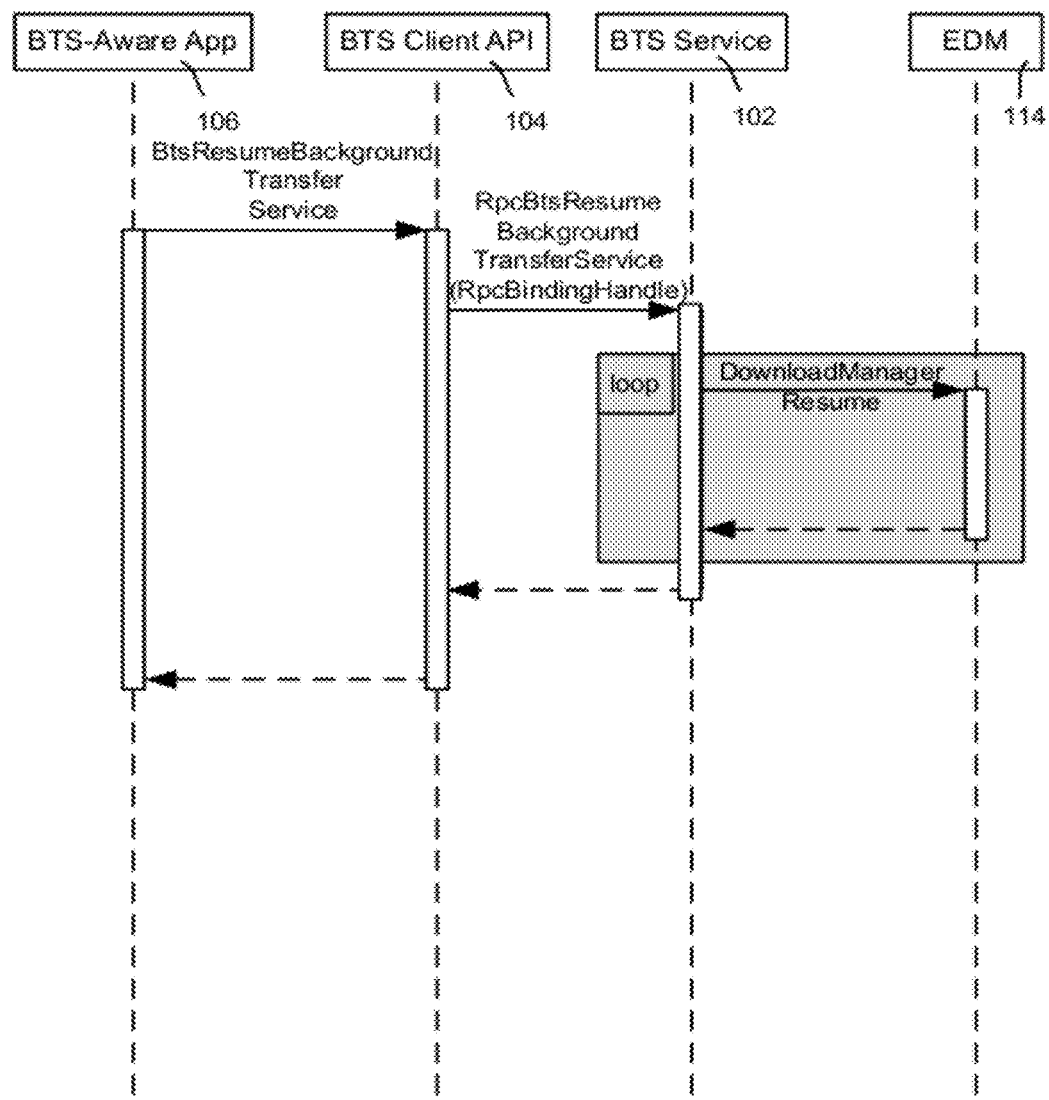
FIG. 13 is a timing sequence/dataflow diagram showing example operations related resuming a background transfer.

FIG. 13 is directed towards resuming background transfer service 102. This resumes any transfers that background transfer service 102 had paused earlier, e.g., due to a pause API call. The background transfer service 102 ensures that only an appropriate chamber caller can call the resume API. The resumption order is the same as the request queue order in background transfer service. This may be done using the DownloadManagerResume API; the entertainment download manager 114 may provide an API that makes the resume sequence doable with one API call. For a download, the entertainment download manager 114 will resume from the last paused point if the server supports HTTP range headers.

Figure 14:
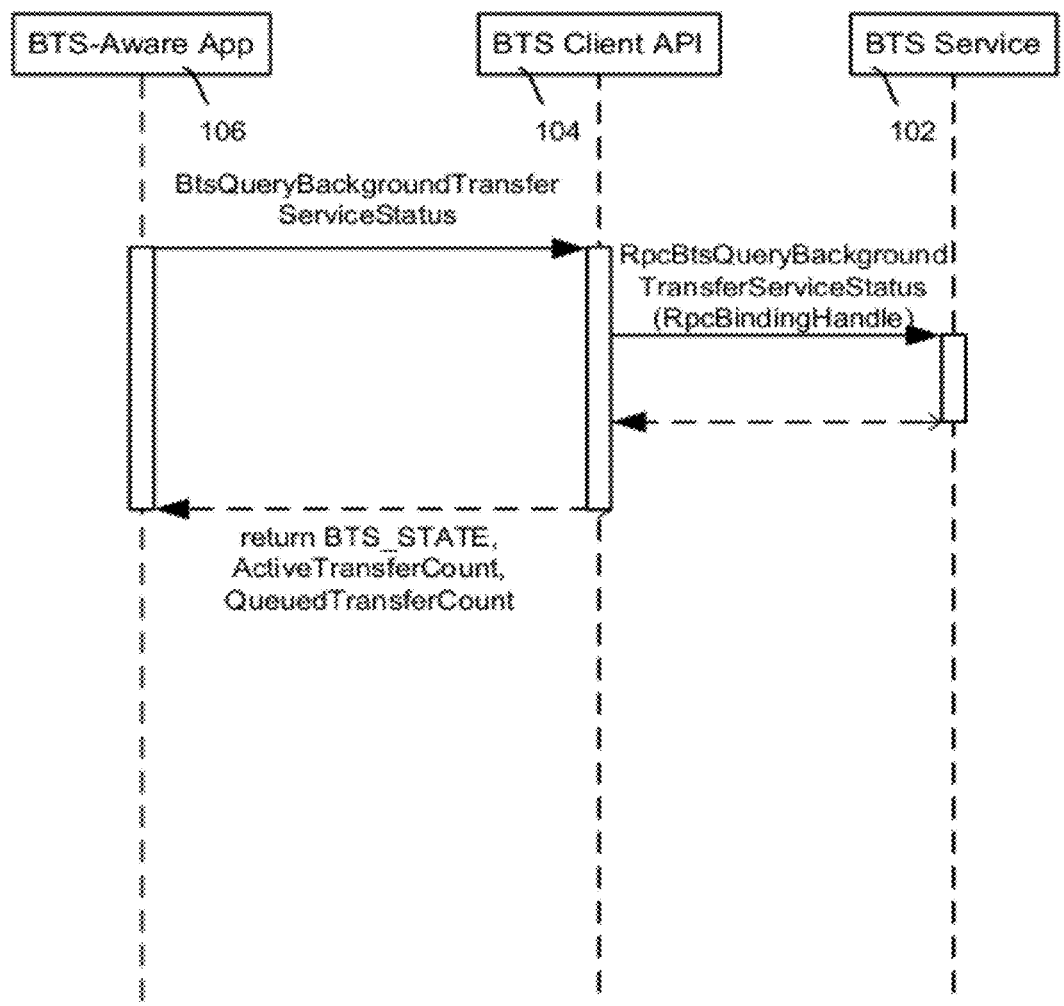
FIG. 14 is a timing sequence/dataflow diagram showing example operations related to querying for background transfer service status.

Querying the background transfer service state is represented in FIG. 14. The background transfer service state may be active (meaning that it is running and not necessarily transferring), or paused and may be queried using an API. In addition, the background transfer service may also return the count of the number of transfer requests that are in transferring and waiting/paused states.

Figure 15:
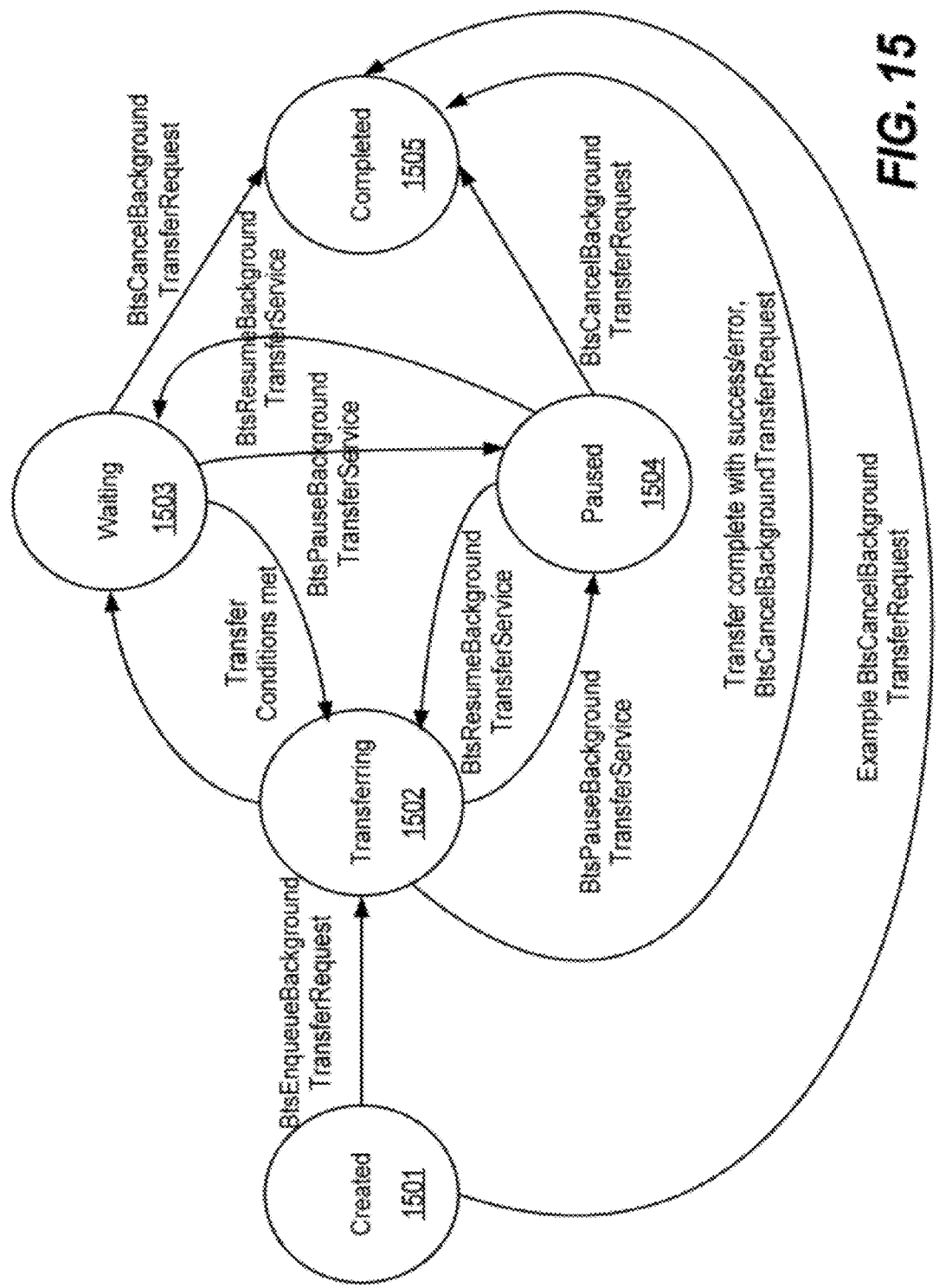
FIG. 15 is a state diagram showing example states of a transfer request in the background transfer service

In one implementation, a transfer request goes through the following states in the background transfer service, as represented in FIG. 15:

State 1501. Created: A background transfer service request has been created by a background transfer service client using the BtsCreateBackgroundTransferRequest API.

State 1502. Transferring: The background transfer service client has queued the transfer request with the background transfer service using the BtsEnqueueBackgroundTransferRequest API and the background transfer service has passed on the request to the entertainment download manager 114.

State 1503. Waiting: The transfer request is waiting in the background transfer service queue since conditions for the transfer have not been satisfied (e.g., for a delayed transfer, the phone is not on AC power).

State 1504. Paused: The background transfer service was paused by a first party application using the BtsPauseBackgroundTransferService API request was paused due to the application instance manager 116 notifying the background transfer service 102 that the application's license has been revoked. This will pause the transfers queued in background transfer service thus far, including the waiting, transferring and created transfer states. As opposed to using just the waiting state, this state is useful for an application to distinguish whether the delay of the transfer is deliberate because a first party application (e.g., resource manager application instance manager 116) paused the transfer or whether it is accidental due to transfer conditions not being met.

State 1505. Completed: The transfer request has been completed because it was canceled by the application using the BtsCancelBackgroundTransferRequest API or it completed with success or an error.

To optimize network bandwidth usage, the entertainment download manager 114 may detect slow and hung transfers by checking whether the transfer rate is below a threshold, so as to consider them as failed and apply retry policies on them. For example, if the transfer rate drops below x kbps on Wi-Fi, the transfer will be paused and resumed at a later time. The entertainment download manager 114 will fail transfers that are over 20 MB if Wi-Fi is not available with a specific error. In that case, the background transfer service will monitor for Wi-Fi connectivity and requeue the transfers with the entertainment download manager 114 when Wi-Fi is back up.

If the background transfer service detects that the expected file size is too large and the transfer request has not specified AC only transfer, then it may cancel the request with the entertainment download manager 114 and return an error to the application. The callback will carry both the expected total file size and currently transferred size. The entertainment download manager 114 may only allow a maximum number of concurrent background transfers (e.g., limited to two or four or a similar limit by default).

Further, the entertainment download manager 114 may throttle back the maximum number of concurrent transfers (default of one) if it detects that the media stack is streaming. Note that when there is no throttling support exposed for clients (including the background transfer service) to use, the background transfer service 102 has to pause and resume transfers automatically based on conditions in the system.

On loss of connectivity, the entertainment download manager 114 moves a transfer request to a waiting state and starts the transfer when connectivity comes back on. If connectivity does not come back on within a timeout, the transfer is canceled by the entertainment download manager 114 and a connection timeout error reported to the background transfer service 102. In that case, the background transfer service will monitor for connectivity and requeue the transfers with the entertainment download manager 114 when connectivity is back up. A connection manager chooses from available connections based upon bandwidth. Thus, in the absence of any specific preferences or requirements (or mapping policy), it will select DTPT (Desktop Passthrough), Wi-Fi, and cellular in that order. Note that in one implementation, once a transfer has started, the type of connection will not change.

The background transfer service 102 performs monitoring in order to queue requests into the entertainment download manager 114, including whether the device has connectivity or not. This is done because the entertainment download manager 114 fails a transfer if connectivity is not available in a certain time, (e.g., 1 minute by default). Hence, the background transfer service monitors connection availability. The background transfer service also monitors the device's power state (AC/battery, battery status).

The background transfer service may queue application requests with the same priority with the entertainment download manager 114, e.g., background priority (DM_TYPE_CONTENT, DM_PRIORITY_OPPORTUNISTIC), which is the lowest of the three entertainment download manager 114 priorities. This is to make sure that third party transfers do not interfere much with first party transfers such as marketplace downloads.

The entertainment download manager 114 supports an application ID to be passed along with each DownloadManagerCreate call as part of the transfer parameters. The background transfer service passes the application product ID as the application ID when it creates the transfer request with the entertainment download manager 114. The entertainment download manager 114 will round robin using the application ID in each queue so that requests from one application ID cannot starve other application requests. Thus, if the entertainment download manager 114 queue contains AppId0(0), AppId0(1), AppId1(0), AppId2(0), the scheduling algorithm picks these requests in order: AppId (0), AppId1(0), AppId2(0), AppId0(1), where AppIdX(y) indicates application X's yth request. The entertainment download manager 114 may limit the maximum number of concurrent transfers for acceptable device performance. In order to prevent one application from taking all the transfer slots in the entertainment download manager 114 and transferring large files, the entertainment download manager 114 may time slice (e.g., two minutes) among applications in a round robin basis and forcibly pause transfers if needed. Note that the entertainment download manager 114 marketplace downloads can take a while go into the opportunistic queue and will multiplex with the background transfer service applications and be included in the round-robin.

With respect to security, the background transfer service 102 may run in the standard rights chamber and be co-hosted with other services in servicesd.exe. RPC security policy may be specified for the background transfer service to allow low privileged chamber applications to call into background transfer service using RPC. As appropriate, the background transfer service cross checks the calling process's product ID using the accounts database APIs and ensure that one application cannot call background transfer service APIs on behalf of another application. Note that because most background transfer service third party application APIs use RPC context handles (not directly but as a side effect of using request handles are wrappers of RPC context handles), they should be protected from spoofing since RPC runtime is hardened against that. However, BtsCreateBackgroundTransferRequest does not take an RPC context handle and instead takes a request ID (which is preferably a GUID) because it is the API that creates the context handle. That API may be hardened against spoofing.

The background transfer service 102 starts when the first call to the API is made by an application. It then checks if it needs to resume any previously incomplete transfers it can start up at boot. For performance reasons, processing immediately after service startup may be delayed, e.g., by using the RegisterDelayedBootWork API. The background transfer service 102 checks the persistent store looking for request items that have been marked with the transferring, paused, or waiting states and then sends them to the entertainment download manager 114 to start the transfer process, or queues them in memory for conditions to be right (e.g., a delayed transfer request with the phone currently on battery) for the transfer process to start. After this is done, the background transfer service can enable its RPC interface and start receiving calls from clients. It also calls into the application instance manager 116 to indicate startup using NotifyBackgroundServiceStart( ), and calls NotifyRequestCreated( ) to inform the application instance manager 116 that the background transfer service 102 has created a new request. When a new request is created using BtsCreateBackgroundTransferRequest API, in one implementation, the background transfer service 102 calls into the application instance manager 116 using NotifyRequestCreated only once per request.

The background transfer service 102 may also check if its request queue has been empty for more than some time (e.g., two minutes) and self-stop on idle. The background transfer service 102 can be reactivated by the background transfer service client using ActivateService( ). It will also call into the application instance manager 116 to indicate stop using NotifyBackgroundServiceStop( ).

With respect to reliability and error handling, the background transfer service 102 may depend on the entertainment download manager 114 to surface transfer errors to it. Once a transfer error is reported by the entertainment download manager 114, or there are other background transfer service errors that prevent a request from completion, it will move the request to the completed state but save the completed status, bytes transferred so far, total expected bytes, and http status along with the request in the persistent store so that an application can later query it. The application deletes requests from the store when it has acted on the result of the transfer appropriately.

With respect to application uninstall, the background transfer service 102 authors an in-process COM server that implements the IBackgroundServiceProxy interface so that the application instance manager 116 can notify the background transfer service when an application is uninstalled or its license revoked/reinstated. The background transfer service notifies the application instance manager 116 of the creation and deletion of each request as well as when the background transfer service 102 has started and is ready to accept notifications from the application instance manager 116

When an application is uninstalled, the background transfer service deletes the requests corresponding to the application. When the application license is revoked, the background transfer service changes the request state to paused along with the status that indicates that the license has been revoked. In this state, APIs that change transfer request state (BtsEnqueueBackgroundTransferRequest, etc.) are not made and they will fail with a licensing error. When the license is reinstated, the request will follow the "transfer conditions are met" path (state 1503 to state 1502 in FIG. 15).

Only a small number of bytes per request need be saved in memory. A candidate list (based on access rate) includes:
1. Fixed length request ID.
2. Fixed length application product ID.
3. Request state.
4. Number of bytes transferred.
5. Total number of bytes.
6. Status of a transfer.

If the data pertinent with the request is not available, the persistent store is referenced. In one implementation, the background transfer service 102 does not park threads for rare events and instead uses thread pooling.

A background transfer service client can optionally subscribe to transfer progress notifications and an application callback will be made at specific completion points of the transfer. The points at which the callbacks are made depend on the entertainment download manager 114's callback into the background transfer service, which occurs at arbitrary intervals. The background transfer service client may use the RPC context handle obtained in the creation step to make an RPC call into background transfer service to register for progress/completed notifications.

As can be seen, the background transfer service provides service to third party applications for transferring files from/to the application's isolated storage in the background, e.g., by using the http/https protocol. The background transfer service provides a set of APIs to third party applications for submitting file transfer requests, checking request status, registering for complete and progress notification or canceling the request. The background transfer service manages requests and processes them even when the application has been dehydrated, terminated or following device reboot. It reports the status back to application.

EXEMPLARY OPERATING ENVIRONMENT

Figure 16:
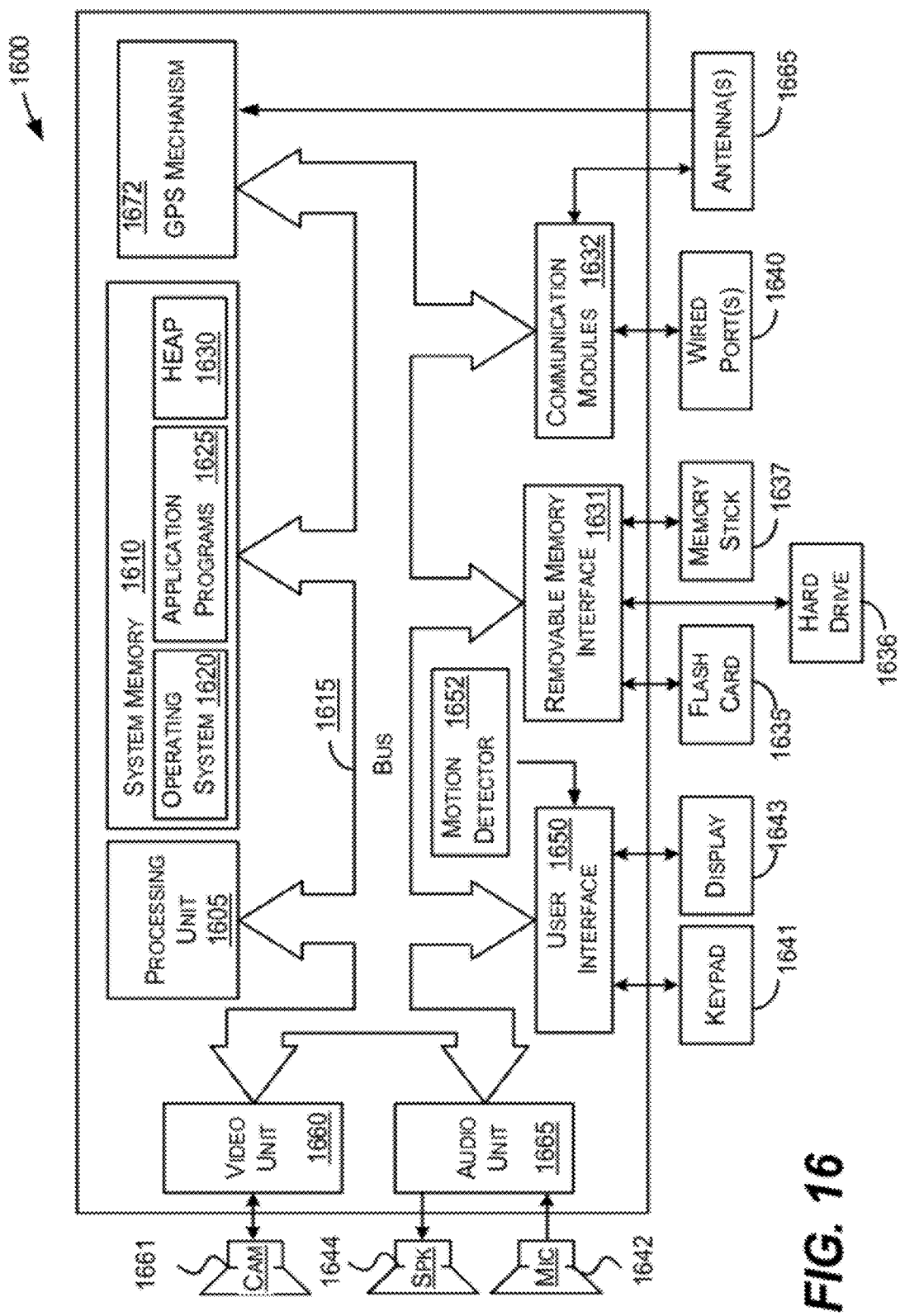
FIG. 16 is a block diagram representing an exemplary non-limiting computing system or operating environment, e.g., in the example of a mobile phone device, in which one or more aspects of various embodiments described herein can be implemented.

FIG. 16 illustrates an example of a suitable mobile device 1600 on which aspects of the subject matter described herein may be implemented. The mobile device 1600 is only one example of a device and is not intended to suggest any limitation as to the scope of use or functionality of aspects of the subject matter described herein. Neither should the mobile device 1600 be interpreted as having any dependency or requirement relating to any one or combination of components illustrated in the exemplary mobile device 1600.

With reference to FIG. 16, an exemplary device for implementing aspects of the subject matter described herein includes a mobile device 1600. In some embodiments, the mobile device 1600 comprises a cell phone, a handheld device that allows voice communications with others, some other voice communications device, or the like. In these embodiments, the mobile device 1600 may be equipped with a camera for taking pictures, although this may not be required in other embodiments. In other embodiments, the mobile device 1600 may comprise a personal digital assistant (PDA), hand-held gaming device, notebook computer, printer, appliance including a set-top, media center, or other appliance, other mobile devices, or the like. In yet other embodiments, the mobile device 1600 may comprise devices that are generally considered non-mobile such as personal computers, servers, or the like.

Components of the mobile device 1600 may include, but are not limited to, a processing unit 1605, system memory 1610, and a bus 1615 that couples various system components including the system memory 1610 to the processing unit 1605. The bus 1615 may include any of several types of bus structures including a memory bus, memory controller, a peripheral bus, and a local bus using any of a variety of bus architectures, and the like. The bus 1615 allows data to be transmitted between various components of the mobile device 1600.

The mobile device 1600 may include a variety of computer-readable media. Computer-readable media can be any available media that can be accessed by the mobile device 1600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 1610 includes computer storage media in the form of volatile and/or nonvolatile memory and may include read only memory (ROM) and random access memory (RAM). On a mobile device such as a cell phone, operating system code 1620 is sometimes included in ROM although, in other embodiments, this is not required. Similarly, application programs 1625 are often placed in RAM although again, in other embodiments, application programs may be placed in ROM or in other computer-readable memory. The heap 1630 provides memory for state associated with the operating system 1620 and the application programs 1625. For example, the operating system 1620 and application programs 1625 may store variables and data structures in the heap 1630 during their operations.

The mobile device 1600 may also include other removable/non-removable, volatile/nonvolatile memory. By way of example, FIG. 16 illustrates a flash card 1635, a hard disk drive 1636, and a memory stick 1637. The hard disk drive 1636 may be miniaturized to fit in a memory slot, for example. The mobile device 1600 may interface with these types of non-volatile removable memory via a removable memory interface 1631, or may be connected via a universal serial bus (USB), IEEE 16394, one or more of the wired port(s) 1640, or antenna(s) 1665. In these embodiments, the removable memory devices 1635-1637 may interface with the mobile device via the communications module(s) 1632. In some embodiments, not all of these types of memory may be included on a single mobile device. In other embodiments, one or more of these and other types of removable memory may be included on a single mobile device.

In some embodiments, the hard disk drive 1636 may be connected in such a way as to be more permanently attached to the mobile device 1600. For example, the hard disk drive 1636 may be connected to an interface such as parallel advanced technology attachment (PATA), serial advanced technology attachment (SATA) or otherwise, which may be connected to the bus 1615. In such embodiments, removing the hard drive may involve removing a cover of the mobile device 1600 and removing screws or other fasteners that connect the hard drive 1636 to support structures within the mobile device 1600.

The removable memory devices 1635-1637 and their associated computer storage media, discussed above and illustrated in FIG. 16, provide storage of computer-readable instructions, program modules, data structures, and other data for the mobile device 1600. For example, the removable memory device or devices 1635-1637 may store images taken by the mobile device 1600, voice recordings, contact information, programs, data for the programs and so forth.

A user may enter commands and information into the mobile device 1600 through input devices such as a key pad 1641 and the microphone 1642. In some embodiments, the display 1643 may be touch-sensitive screen and may allow a user to enter commands and information thereon. The key pad 1641 and display 1643 may be connected to the processing unit 1605 through a user input interface 1650 that is coupled to the bus 1615, but may also be connected by other interface and bus structures, such as the communications module(s) 1632 and wired port(s) 1640. Motion detection 1652 can be used to determine gestures made with the device 1600.

A user may communicate with other users via speaking into the microphone 1642 and via text messages that are entered on the key pad 1641 or a touch sensitive display 1643, for example. The audio unit 1655 may provide electrical signals to drive the speaker 1644 as well as receive and digitize audio signals received from the microphone 1642.

The mobile device 1600 may include a video unit 1660 that provides signals to drive a camera 1661. The video unit 1660 may also receive images obtained by the camera 1661 and provide these images to the processing unit 1605 and/or memory included on the mobile device 1600. The images obtained by the camera 1661 may comprise video, one or more images that do not form a video, or some combination thereof.

The communication module(s) 1632 may provide signals to and receive signals from one or more antenna(s) 1665. One of the antenna(s) 1665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 1672. In turn, the GPS mechanism 1672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1600 may connect to one or more remote devices. The remote devices may include a personal computer, a server, a router, a network PC, a cell phone, a media playback device, a peer device or other common network node, and typically includes many or all of the elements described above relative to the mobile device 1600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
at least one processing unit; and
a background transfer service implemented on the at least one processing unit and configured to run on a mobile device at a platform-level to control data transfers of a plurality of applications, the data transfers comprising data transfers from a first background application and a second background application, the at least one processing unit programmed to:
manage application requests for the data transfers based upon one or more policies that control resource usage of background application data transfers to limit interference with foreground application operations, wherein the one or more policies comprise one or more of the following: a maximum number of outstanding transfers at a time, a data size-based limitation, a connection rule, a bandwidth limitation, and one or more conditions comprising: other application data transfer requests, available cellular service, Wi-Fi availability, desktop pass-through availability, power state, battery power level, and a charging state;
prioritize a first data transfer for the first background application over a second data transfer for the second background application;
generate one or more notifications associated with the data transfers current progress; and
provide the one or more notifications to the plurality of applications that requested the data transfers.

2. The system of claim 1 further comprising a download manager configured to make remote connections to transfer data to or from a remote source to satisfy a transfer request.

3. The system of claim 2 further comprising a data sharing service configured to one of move or copy one or more of the following: data transferred from the remote source into isolated storage associated with the application, and data from isolated storage associated with the application for transferring the data to the remote source.

4. The system of claim 1 further comprising an application instance manager configured to provide to the background transfer service a notification related to one or more of the following: application uninstall status, and license revocation or reinstatement status.

5. The system of claim 1, wherein the at least one processing unit is further programmed to:
receive information indicating that one or more of the first and second background applications are being uninstalled; and
cancel one or more of the first and second data transfer requests corresponding to the one or more first and second background applications being uninstalled.

6. The system of claim 1, wherein wherein the at least one processing unit is further programmed to:
receive information indicating that a license of one or more of the first and second background applications is revoked; and
pause one or more of the first and second data transfer requests corresponding to the one or more first and second background applications having the revoked license.

7. In a computing environment, a method performed at least in part on at least one processor, the method comprising:
transferring data on behalf of one or more applications including a foreground application and a first background application and a second background application that are in the background during at least part of the transferring of the data, wherein transferring the data further comprises:
receiving a first data transfer request from the first background application and a second data transfer request from the second background application;
prioritizing the first data transfer request over the second data transfer request based upon one or more policies that control resource usage of background application data transfers, wherein the one or more policies comprise one or more of the following: a maximum number of outstanding transfers at a time, a data size-based limitation, a connection rule, a bandwidth limitation, and one or more conditions comprising: other application data transfer requests, available cellular service, Wi-Fi availability, desktop pass-through availability, power state, battery power level, and a charging state;
queuing information corresponding to the first and second data transfer requests from the first background application and the second background application in a request queue based upon the one or more policies that control resource usage of background application data transfers; and
processing the information from the request queue.

8. The method of claim 7 further comprising managing one or more of the first and second data transfer requests by determining whether one or more transfer conditions are met, and if not, moving the one or more first and second data transfer requests to a waiting state until the one or more transfer conditions are met.

9. The method of claim 7 further comprising managing one or more of the first and second data transfer requests by determining whether to allow the one or more first and second data transfer requests based upon a size of the data to transfer.

10. The method of claim 7 further comprising managing one or more of the first and second data transfer requests by detecting a slow transfer state by checking whether a transfer rate is below a threshold, and in response to detecting the slow transfer state, waiting for a changed condition before resuming the transferring of the data.

11. The method of claim 7 further comprising:
receiving information indicating that one or more of the first and second background applications are being uninstalled; and
canceling one or more of the first and second data transfer requests corresponding to the one or more first and second background applications being uninstalled.

12. The method of claim 7 further comprising:
receiving information indicating that a license of one or more of the first and second background applications is revoked; and
pausing one or more of the first and second data transfer requests corresponding to the one or more first and second background applications having the revoked license.

13. The method of claim 12 further comprising:
receiving information indicating that the license of the one or more first and second background applications is reinstated; and
resuming the paused one or more first and second data transfer requests corresponding to the one or more first and second background applications having the reinstated license.

14. The method of claim 7 further comprising:
receiving information indicating that one or more of the first and second background applications has changed from a background application to a new foreground application; and
re-prioritizing at least one pending data transfer request of the new foreground application.

15. The method of claim 7 further comprising:
receiving information indicating that an application has changed from a foreground application to a third background application; and
re-prioritizing at least one pending data transfer request of the third background application.

16. The method of claim 7, wherein the second background application is tombstoned.

17. One or more computer storage devices having computer-executable instructions, which on execution perform operations, comprising:
receiving data transfer requests from a plurality of applications, the plurality of applications comprising a first background application and a second background application, the data transfer requests comprising a first data transfer request to download data on behalf of the first background application and a second data transfer request to download data on behalf of the second background application;
prioritizing the first data transfer request over the second data transfer request based upon one or more policies that control usage of background application data transfers, wherein the one or more policies comprise one or more of the following: a maximum number of outstanding transfers at a time, a data size-based limitation, a connection rule, a bandwidth limitation, and one or more conditions comprising: other application data transfer requests, available cellular service, Wi-Fi availability, desktop pass-through availability, power state, battery power level, and a charging state;
queuing information corresponding to the first data transfer request in a request queue;
processing the information from the request queue, including downloading data on behalf of the first background application into a request store; and
communicating with a service that has access rights to move or copy the data from the request store to isolated storage associated with the first background application.

18. The one or more computer storage devices of claim 17 having further computer-executable instructions comprising:
receiving a request for status information from one or more of the first and second background applications, the status information related to a status of the first and second data transfer requests associated with the requesting one or more of the first and second background applications; and
returning status information in response to the request.

19. The one or more computer storage devices of claim 17 having further computer-executable instructions comprising:
receiving a third data transfer request comprising an upload request to upload other data on behalf of a third application of the plurality of applications;
queuing other information corresponding to the upload request in the request queue;
processing the other information from the request queue, including communicating with a service that has rights to access the other data in a second isolated storage associated with the third application; and
uploading the other data on behalf of the third application.

20. The one or more computer storage devices of claim 17, wherein the isolated storage associated with the first background application comprises a local storage unique to the first background application that provides different access rights represented by one or more privilege chambers.

* * * * *